United States Patent
Zhao et al.

(10) Patent No.: US 12,521,582 B2
(45) Date of Patent: Jan. 13, 2026

(54) SEAL EVALUATION SYSTEMS AND METHODS FOR RESPIRATORY PROTECTION DEVICES

(71) Applicant: 3M INNOVATIVE PROPERTIES COMPANY, St. Paul, MN (US)

(72) Inventors: Wei Zhao, Wooodbury, MN (US); Wenbo Dong, Lakeville, MN (US); Yutao Gong, Woodbury, MN (US); Xuan Wang, Woodbury, MN (US); Francis T. Caruso, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 183 days.

(21) Appl. No.: 18/578,544

(22) PCT Filed: Jul. 5, 2022

(86) PCT No.: PCT/IB2022/056218
§ 371 (c)(1),
(2) Date: Jan. 11, 2024

(87) PCT Pub. No.: WO2023/285917
PCT Pub. Date: Jan. 19, 2023

(65) Prior Publication Data
US 2024/0293687 A1    Sep. 5, 2024

Related U.S. Application Data

(60) Provisional application No. 63/203,307, filed on Jul. 16, 2021.

(51) Int. Cl.
*A62B 27/00* (2006.01)
*G06T 7/11* (2017.01)
(Continued)

(52) U.S. Cl.
CPC ............ *A62B 27/00* (2013.01); *G06T 7/11* (2017.01); *G06T 17/205* (2013.01); *A61M 2016/0015* (2013.01); *G06T 2207/10048* (2013.01)

(58) Field of Classification Search
CPC ......... A62B 27/00; G06T 7/11; G06T 17/205; G06T 2207/10048; A61M 2016/0015
See application file for complete search history.

(56) References Cited

U.S. PATENT DOCUMENTS

| 4,846,166 A | 7/1989 | Willeke |
| 8,528,559 B2 | 9/2013 | Crutchfield |

(Continued)

FOREIGN PATENT DOCUMENTS

| CZ | 2020242 A3 | 6/2020 |
| WO | 2017172358 A1 | 10/2017 |

(Continued)

OTHER PUBLICATIONS

Harber, "Potential Role of Infrared Imaging for Detecting Facial Seal Leaks in Filtering Facepiece Respirator Users", Journal of Occupational and Environmental Hygiene, 2015, vol. 12, No. 06, pp. 369-375.

(Continued)

*Primary Examiner* — David P Porta
*Assistant Examiner* — Fani Polyzos Boosalis
(74) *Attorney, Agent, or Firm* — Katherine M. Scholz; Jonathan V. Sry

(57) ABSTRACT

A fit detection system for a respiratory protection device is presented that includes an infrared camera that captures an image sequence of a user wearing the respiratory protection device. The system also includes a temperature change detector that analyzes images in the image sequence and detects a temperature change profile of the respiratory (Continued)

protection device. The system also includes a communication component that communicates a fit indication based on the detected temperature change profile.

20 Claims, 15 Drawing Sheets

(51) Int. Cl.
    *G06T 17/20*     (2006.01)
    *A61M 16/00*     (2006.01)

(56) References Cited

U.S. PATENT DOCUMENTS

| | | | |
|---|---|---|---|
| 9,352,113 | B2 | 5/2016 | Deguilio |
| 9,707,361 | B2 | 7/2017 | Brewer et al. |
| 11,748,983 | B2 | 9/2023 | Donoghue et al. |
| 12,329,216 | B2 * | 6/2025 | Masna ................ A61B 5/4836 |
| 2016/0162604 | A1 | 6/2016 | Wang et al. |
| 2017/0173371 | A1 | 6/2017 | Truex et al. |
| 2020/0258267 | A1 * | 8/2020 | Asano ................ G06T 11/001 |
| 2023/0364365 | A1 * | 11/2023 | Hogg ................ G16H 50/70 |
| 2024/0139448 | A1 * | 5/2024 | Liu ................ A61M 16/0622 |

FOREIGN PATENT DOCUMENTS

| | | |
|---|---|---|
| WO | 2020174318 A1 | 9/2020 |
| WO | 2022235472 A1 | 11/2022 |

OTHER PUBLICATIONS

International Search Report for PCT International Application No. PCT/IB2022/056218, mailed on Sep. 27, 2022, 4 pages.
Roberge, "Infrared Imaging for Leak Detection of N95 Filtering Facepiece Respirators: A Pilot Study", American Journal of Industrial Medicine, 2011, vol. 54, No. 8, pp. 628-636, XP071569011.

* cited by examiner

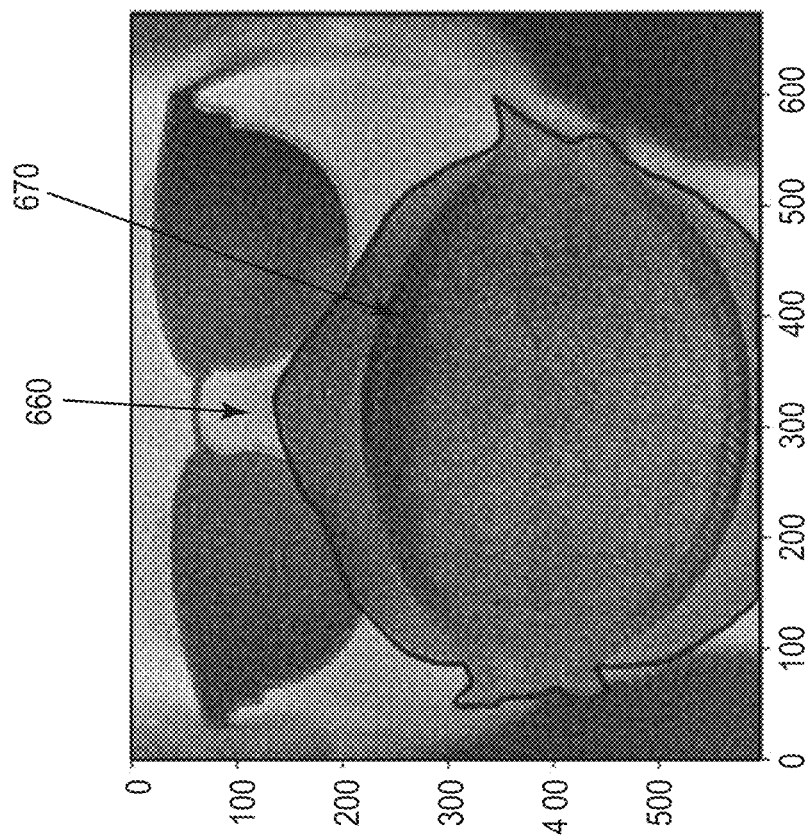
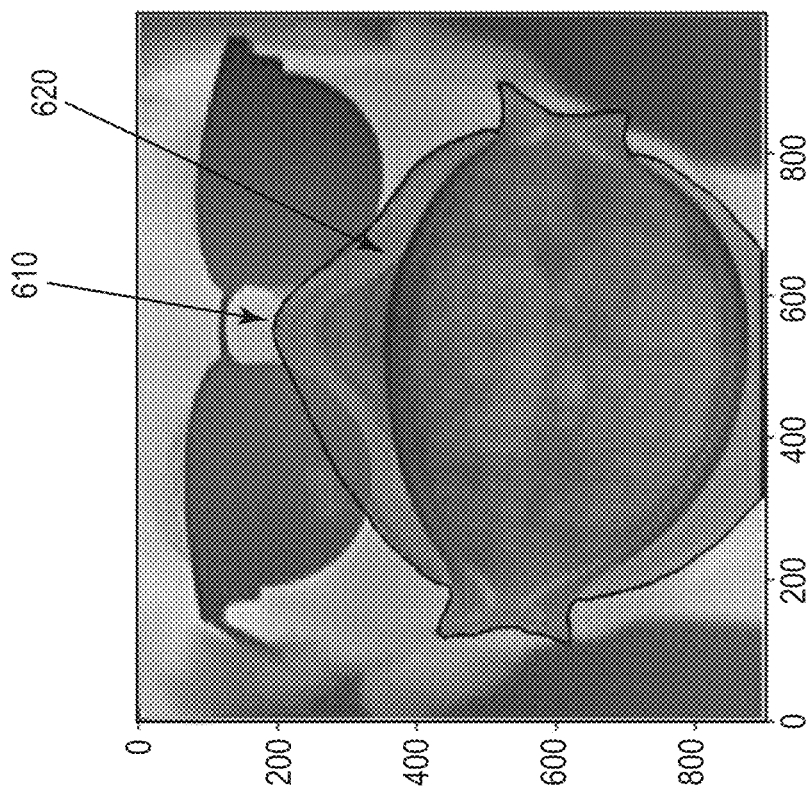
FIG. 6A
FIG. 6B

SEAL EVALUATION SYSTEMS AND METHODS FOR RESPIRATORY PROTECTION DEVICES

CROSS REFERENCE TO RELATED APPLICATIONS

This application is a national stage filing under 35 U.S.C. 371 of PCT/IB2022/056218, filed Jul. 5, 2022, which claims the benefit of U.S. Provisional Application No. 63/203,307, filed Jul. 16, 2021, the disclosure of which is incorporated by reference in its/their entirety herein.

BACKGROUND

As a commonly used protective article, a respiratory protection device is often used to protect against dust, mist, bacteria, etc., and is widely used in specific working environments and daily life. Respiratory protection devices and other face coverings are designed to provide a barrier to particulates and airborne or droplet-borne diseases, both by keeping exhalations from an infected individual contained and by providing a barrier from the coughs or exhalations of others. Respiratory protection devices (RPD) have been required PPE for healthcare and many industrial environments for years, and have seen increasing use as COVID-19 has required their usage in public places globally.

SUMMARY

An objective of the present invention is to provide systems and methods for checking the quality of a seal of a respiratory protection device (RPD) worn by an individual in an environment. In-situ seal checks, without significant disruption to the individual, can more accurately detect insufficient sealing and provide feedback to the individual, which can better protect them from particulates, gas, microbes or other risks. Infrared imaging provides a quick way to evaluate a seal of an RPD, determine locations of potential leaks, and provide feedback without significant disruption to the wearer of the RPD. Frequent seal checks, and rapid feedback, may increase safety of the wearer.

A fit detection system for a respiratory protection device is presented that includes an infrared camera that captures an image sequence of a user wearing the respiratory protection device. The system also includes a temperature change detector that analyzes images in the image sequence and detects a temperature change profile of the respiratory protection device. The system also includes a communication component that communicates a fit indication based on the detected temperature change profile.

BRIEF DESCRIPTION OF THE DRAWINGS

The embodiments of the present invention are described below merely as examples with reference to the accompanying drawings. In the accompanying drawings, the same features or components are represented by the same reference numerals, and the accompanying drawings are not necessarily drawn to scale. Further, in the accompanying drawings:

FIGS. 6A-6B illustrate segmented images of an individual wearing an RPD.

DETAILED DESCRIPTION

Figure 1:
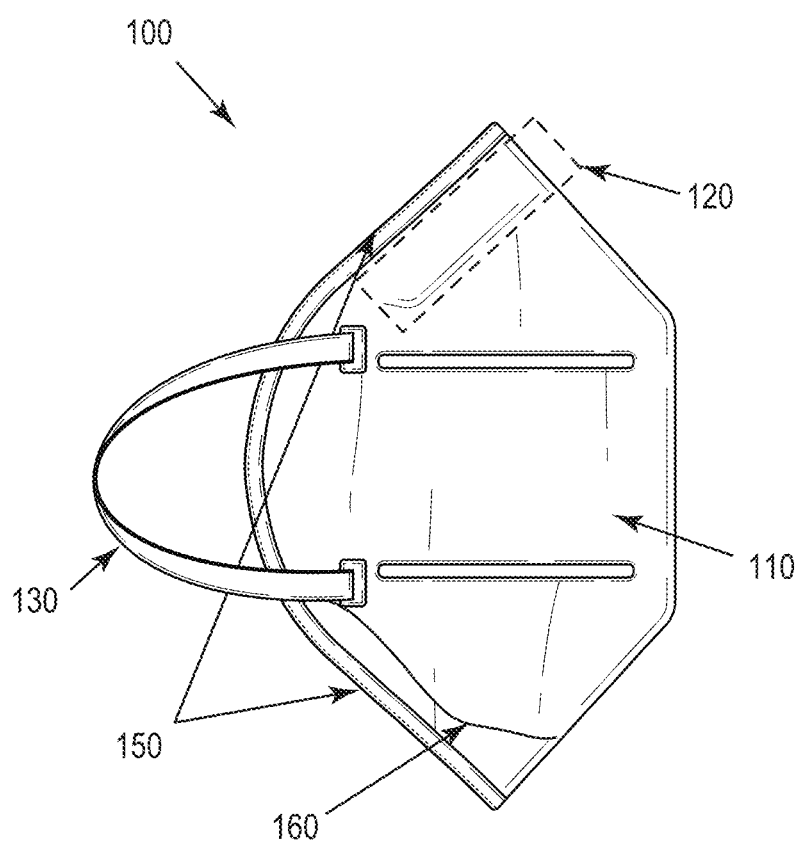
FIG. 1 is a view of a respirator.

The following descriptions are substantially merely exemplary, and are not intended to limit the present invention, the application, and the use. It should be understood that in all of the accompanying drawings, similar reference numerals represent the same or similar parts and features. The accompanying drawings illustratively show the idea and principles of the embodiments of the present invention, but do not necessarily show specific size of each embodiment of the present invention and the scale thereof. In some parts of specific accompanying drawings, related details or structures of the embodiments of the present invention may be illustrated in an exaggerated manner.

The use of personal protective equipment (PPE) has become an important part of the strategy to limit the spread of respiratory infections. Respiratory protection devices (RPDs) have become increasingly important globally as COVID-19 has spread. Two types of respiratory protection devices are in increasingly common use: filtering facepiece respirators (FFRs, referred to as "respirators" herein) and face masks (commonly called masks, often made of cloth). As used herein the term "respiratory protection devices" may refer to respirators, face masks, or other facial coverings.

The term "face mask" generally refers to a face covering that inhibits droplets from the wearer from spreading, e.g. from a cough or a sneeze. However, face masks often provide little or no protection against droplets from another individual. FFRs, in contrast, are designed to seal to a user's face, such that inhaled air is forced through one or more filter layers, such that most droplets, microbes, and particulates are removed from inhaled air before it reaches a wearer. Additionally, some FFRs include charged fibers that attract microbes or particulates, providing increased protection.

Filtering facepiece respirators (FFRs) are sometimes referred to as disposable respirators (DRs). When worn properly, FFRs are designed to protect the wearer by removing harmful particles from inhaled air. FFRs are regulated by the National Institute for Occupational Safety and Health (NIOSH). To provide the required level of protection, an FFR must seal to the wearers face, preventing gaps between the respirator and the wearer's skin since such gaps can allow contaminated air to leak into the breathing zone of the wearer. Therefore, tight fit of the FFR to the face of the wearer is essential.

Respiratory protection devices are mass produced with the goal of fitting many different facial structures, including male and female, high or low cheekbones, prominent jaws, etc. Additionally, respiratory protection devices are often worn during activity, such that the wearer may have different facial expressions during use, may walk or run, may sweat or laugh. Additionally, different types and different models of respiratory protection device may be worn at different facial positions for the same user, depending on usage or activity.

Ideally, when worn, a respiratory protection device should fit the contour of the face of a wearer to form good sealing between the respirator and the face of the wearer. However, the contour of the face of the wearer is not the same between individuals, and there can be large differences from individual to individual. The contour of the nose is complex and fluctuates; it is often difficult to form a good seal, and a gap is often present between the respiratory protection device and the nose area of the wearer, resulting in a poor sealing effect. As a result, dust, mist or bacteria, virus, fungi in an environment where the wearer is located will be in contact with the wearer through the gap and is inhaled by the wearer, thus affecting the protective effect of the respirator. Additionally, the exhaled breath of the wearer will also be discharged upwards through this gap. For the case where the wearer wears glasses, if the temperature in the respirator is higher than the ambient temperature, the exhaled breath will cause fogging and affect the wearing experience of the wearer.

Therefore, in order to improve the protective effect of a respiratory protection device and improve the wearing experience, it is expected that the respiratory protection device can fit the contour of the face of the wearer and achieve good sealing between the respiratory protection device and the face of the wearer. In some RPDs, a metal or plastic nose strip with a memory effect is used to hold the RPD against a face of an individual. However, other sealing or seal-improving options may be used, including a shaped nose foam as described in U.S. Provisional Patent Application with Ser. No. 63/201,604, filed on May 6, 2021.

The RPD should stay in place on an individual's face during any time the user is exposed to potentially harmful particulates or microbes. Many users of RPDs do not remain stationary during a workday, but move around, speak, walk, run, etc. For example, in an industrial setting a user may wear a respiratory protection device for one, two, four or even 8 hours while a clinician in a hospital may wear a respiratory protection device for an entire shift (8 hrs) or perhaps even a double shift (16 hrs). It is conceivable, potentially even likely, that an RPD may move during this time, potentially causing a good seal to become a bad seal. Detecting when an individual's RPD no longer adequately seals to their face, and is no longer providing sufficient protection, increases safety in a workplace. It is important that systems and methods for checking a system be simple to use or interact with, provide quick feedback, and be touch-free, so that an individual does not lose significant amounts of time during a shift. Additionally, it is desired that systems and methods not rely on a component built into the RPD, as it is desired to keep costs of individual RPDs low.

Described herein are systems and methods that may be useful for environments in which users wear respiratory protection devices generally. Systems and methods herein may be useful for in-situ seal checks for individuals wearing RPDs.

FIG. 1 is a view of a respirator. Respirator 100 is an earloop respirator. In the example shown in the drawing, respirator 100 is a foldable earloop respirator. However, the present invention is not limited thereto, and may also be applied to non-foldable or non-earloop respirators as well as to other RPDs more broadly. In the manufacturing process of the first respirator 100, a formable nose piece (often metal, however other suitable materials are envisioned) is attached to an inner or outer side of a respirator main body 110, within area 120. When the first respirator 100 is worn, a lanyard 130 is hung on the left and right ears of the wearer, respectively.

It is intended that a user adjust respirator 100 so that the nose of the wearer is accommodated in by adjusting the formable nose piece such that area 120, and the exterior edge 150 conform to the contour of the face of the wearer to closely fit the periphery of the nose of the wearer, thus reducing or even eliminating the gap between the respirator and the nose of the wearer. A good seal between respirator 100 and the face of the wearer is important for safety concerns.

Earloops 130, or another tension device such as a headband, pull RPD 100 toward the face of a user, causing a seal to form on a face contacting portion of the RPD. A seal may not necessarily form along edges 150. For example, a seal may form along line 160, where a user's chin seals the RPD along a jawline.

Figure 2B:
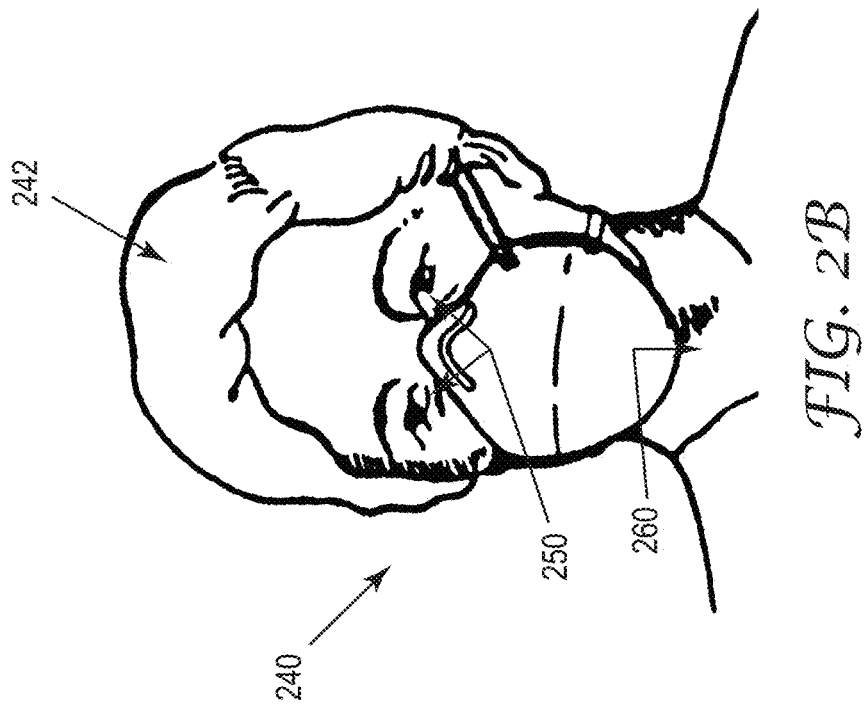
FIGS. 2A and 2B illustrate respiratory protection devices (RPDs) worn by users in which embodiments of the present invention may be useful.
Figure 2A:
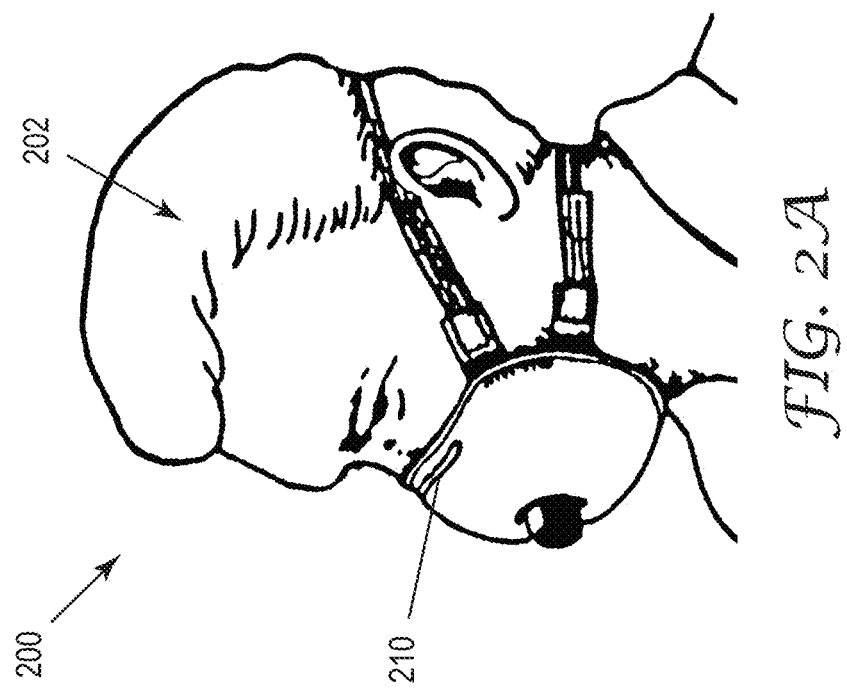

FIGS. 2A and 2B illustrate a respiratory protection device worn by a user in which embodiments of the present invention may be useful. As illustrated in FIGS. 2A and 2B, respiratory protection devices 200 and 240 can be secured over a user's face using a variety of methods other than the lanyard illustrated in FIG. 1.

Respiratory protection devices 200 and 240 are intended to form a seal along the edges of the RPD, where the face-contacting side contacts the face. If an imperfect seal is present, then exhaled air may be forced upward, out of the nose portion as indicated by arrows 250, and/or downward, out through the chin portion, as indicated by arrow 260. causing discomfort for some users, and may also cause respiratory protection devices 200, 240 to move up or down along a nose of user 202. A user can adjust a nose clip 210 to improve the fit of respiratory protection devices 200, 240. It may also be necessary, if a particular RPD 200, 240 does not fit well, to move up or down in size, or to switch to a different model of RPD.

All objects emit infrared radiation as a function of temperature. The emitted thermal energy can be seen using an infrared (IR) camera. IR waves may be captured in any of four bands—near-IR around 0.75 µm, middle IR around 3-6 µm, far IR around 6-15 µm, or extreme IR around 15-100 µm. An IR camera can be used to detect potential seal-leakages of an RPD as the temperature of exhaled air is usually higher than a temperature of an indoor environment, resulting in a skin surface temperature change as the flow of exhaled gas escapes through seal leaks. Alternatively, it can be seen that the maximum temperature of air expelled from an FFR is lower than the temperature of the exhaled air because of the mixing of air that leaks in from the exterior during an inhale. Therefore, by capturing and analyzing a temperature profile of an individual wearing an RPD, it can be determined whether a leak is present in the RPD seal and, in some cases, where the leak is located.

It is desired to have a system or method that can check the seal of an RPD 200, 240 while users 202, 242 are in a working environment. For example, users 202, 242 may be doctors, nurses or other healthcare workers in a hospital where they may be exposed to dangerous microbes. Or users 202, 242 may be workers in an industrial setting where they may be exposed to particulates or gases.

It is important that users 202, 242 have a good seal present at all times when in a work environment where an RPD is required. Seal check sensors have been added to RPDs in the past to allow a user to obtain an instantaneous check of an RPD seal. However, this requires a user 202, 242 to have purchased an RPD with such a sensor, which will have an increased cost compared to an RPD without a sensor. Additionally, at least some sensors require the user to activate, or touch to initiate a seal check. This is not desirable as it requires a user to interrupt their activity and touch their mask (which may be particularly undesirable in a healthcare setting), which may also cause the mask position to change.

Additionally, sensors are currently not available for filtering facepiece respirators, but only for elastomeric or rubber face pieces. It is desired to be able to monitor a variety of RPDs.

In industries where tight-fitting facepieces, such as RPDs are required, fit testing is the responsibility of the employer, and may be done annually or more frequently. Fit testing is done to ensure that an individual has an RPD that provides a good seal with a tight-fitting mask. Because face structures can vary widely between individuals, fit testing should happen during the initial selection of an RPD, before it is worn in a hazardous environment.

Users are responsible for conducting fit checks every time an RPD is used. A user must understand how to conduct a fit check each time an RPD is put on, and be trained in the technique for fit checking each model of RPD they use. Negative and positive pressure techniques may be used to judge the quality of the fit. However, individuals are not perfect and it is possible for a user to forget to fit check an RPD, forget how to fit-check an RPD, or conduct the fit check incorrectly. Even when done correctly, judging the quality of a fit does not necessarily result in a numeric value that clearly provides an indication that a fit is good or poor.

It is desired to have a system or method for conducting fit checks that takes some of the responsibility or guesswork out of the hands of the users. A system or method that can provide a determination of whether an RPD is sufficiently sealed provides reassurance to both a user and an employer. Such systems and methods are envisioned in embodiments herein. Systems and methods used herein rely on a camera that can capture images in any one of a near IR, middle IR, far IR or extreme IR spectra bands to detect and analyze a temperature profile for an individual.

As discussed in greater detail herein, infrared imaging is one option for evaluating airflow through and around RPDs. A user exhales air at a body temperature. The air passes through the RPD, into the ambient environment of a room, raising the temperature of the air within the RPD to a temperature close to body temperature. Generally, the ambient air is of a different temperature than the body temperature of the user, either detectably warmer or colder. As the user inhales, cooler air is pulled into the RPD from the ambient environment, causing a temperature within the RPD to return to a temperature close to the ambient temperature. The difference in temperature between an inhale temperature (roughly ambient temperature) and exhale temperature (roughly body temperature), may indicate whether a seal is sufficient.

Figure 3:
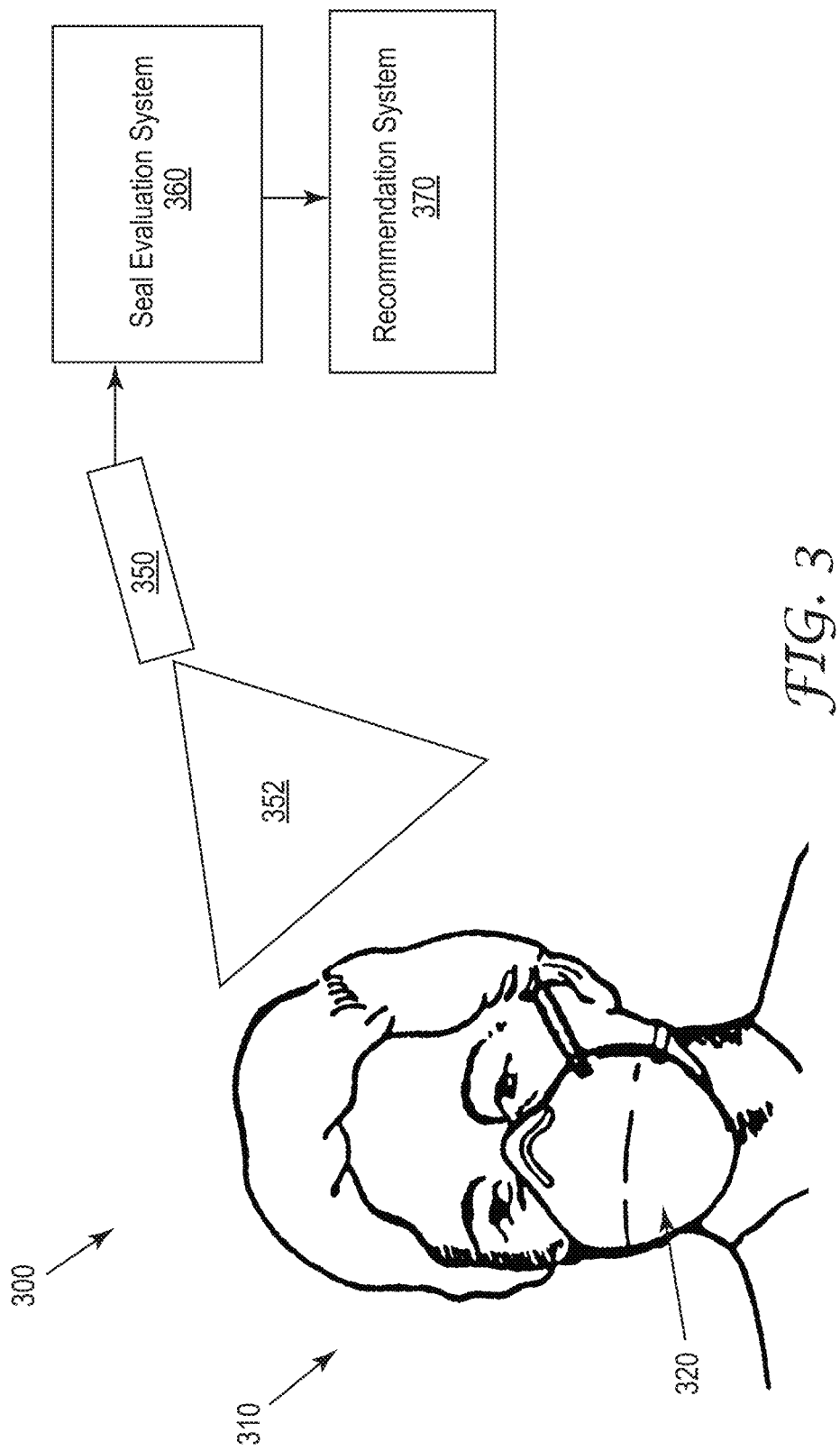
FIG. 3 illustrates a schematic of a system for checking an RPD seal on an individual in an environment in accordance with embodiments herein.

FIG. 3 illustrates a schematic of a system for checking an RPD seal on an individual in an environment in accordance with embodiments herein. A seal evaluation system 360 is located in an environment 300. A user 310 is in environment 300 and is wearing an RPD. Environment 300 may be a healthcare environment, an industrial environment, or any other environment where RPDs 320 are required PPE for individuals 310.

As discussed in greater detail herein, an environment 300 may include one or more IR imaging cameras 350, each with a field of view 352. In some embodiments, camera 350 may be a mounted camera, for example a security camera mounted in a corner or on a wall. In some embodiments, camera 350 may be a semi-mobile camera, for example in a fixed position with a pan and tilt assembly. In some embodiments, camera 350 is a mobile camera, for example mounted on another user or mounted on a mobile robot capable of moving about environment 300. It is also expressly envisioned that environment 300 may have multiple cameras, each positioned with differing fields of view 352. However, for ease of understanding, only one camera 350 is illustrated in FIG. 3. It may be desired for the camera system to match the movement of the user, or for the user to remain relatively stationary during the imaging. However, it is also expressly contemplated that systems and methods herein may denoise image data from human movement or shaking using machine learning based image denoise algorithms.

For processing of the data, a temperature difference of the mask on inhale vs exhale could be calculated from the image or the mesh. The data could also be utilized to examine temperature differences within zones of the mask such as around the nose bridge or jaw line.

IR camera 350 has a field of view 352 that captures an image, series of images, or video of user 310 when user 310 enters field of view 352. Seal evaluation system 360 receives images of user 310 and, based on the images, determines whether or not a fit is satisfactory. For example, a filtering facepiece respirator moves when a user breathes in and out. If the fit is good, a clear temperature profile can be detected between an inhale and an exhale, which is visible through color changes of pixels in images captured by IR camera 350. If a leak is present, the temperature profile may be less distinct between an inhale and exhale as ambient air is drawn into the RPD space by a leak.

Seal evaluation system 360 may output a numerical evaluation of a seal for an RPD 320 to a recommendation system 370. The seal evaluation may be an indication of whether the seal is adequate or not, an indication of whether (or where) a leak is detected, or may include instructions for improving a seal. Recommendation system 370 may indicate to individual 310 that RPD 320 is adequately sealed, or not adequately sealed. If RPD 320 is not adequately sealed, then system 370 may provide some recommendations to increase the safety of individual 310, for example by repositioning RPD 320, adjusting a nosepiece of RPD 320, or by recommending a user change out RPD 320 for a different size or model.

Camera 350 may be any suitable IR camera that captures images in the near, middle, far or extreme IR spectra bands. Camera 350 may capture a video stream, or capture images periodically. Camera 350 may only capture images, or send captured images to seal evaluation system 360, based on detection of individual 310 in field of view 352.

Figure 4B:
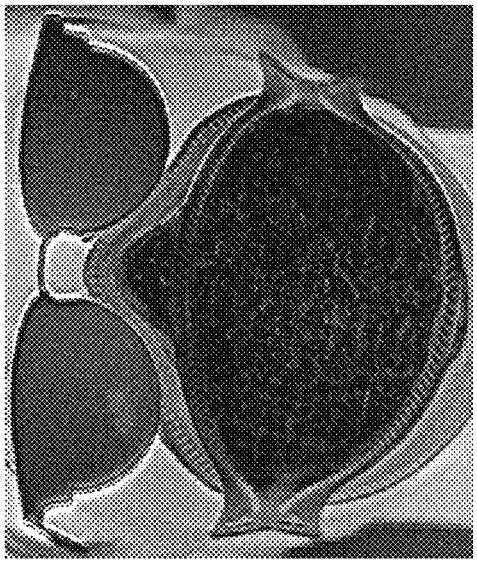
FIGS. 4A-4D are IR images of an individual wearing an RPD.
Figure 4D:
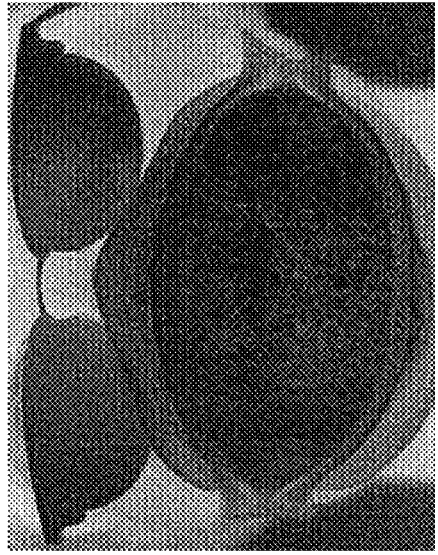
Figure 4A:
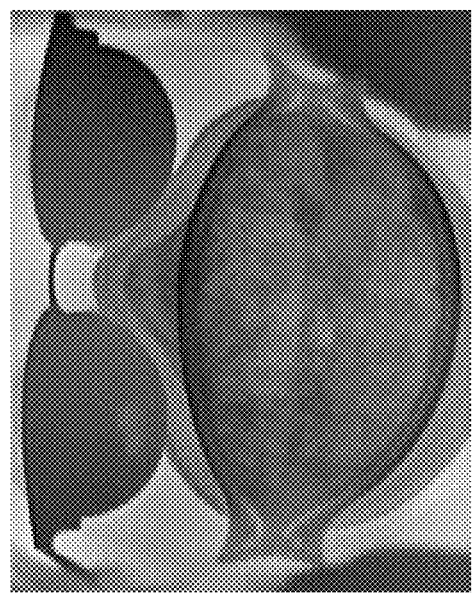
Figure 4C:
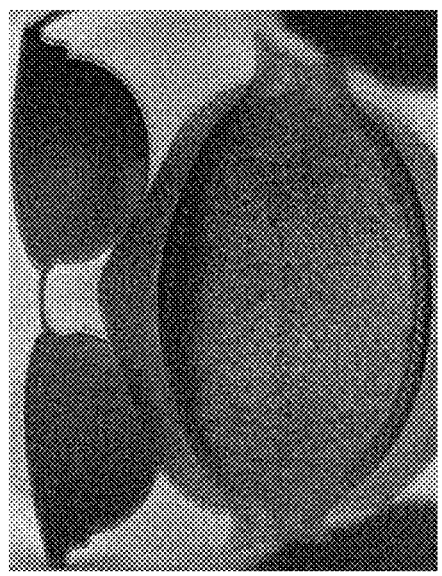

FIGS. 4A-4D are IR images of an individual wearing an RPD. FIG. 4A illustrates a user exhaling while wearing an RPD with a good seal. FIG. 4B illustrates a user inhaling while wearing an RPD with a good seal. FIG. 4C illustrates a user exhaling while wearing an RPD with a leaky seal. FIG. 4D illustrates a user inhaling while wearing an RPD with a leaking seal. When a good seal is present, the contour of the RPD is very clear, particularly during the exhale. The good seal ensures that all of the warm, moist air is captured within the RPD, resulting in a clear contour.

FIGS. 4C and 4D illustrate an RPD with some leakage around the nose region, particularly the right eye of the wearer. Air is able to leak out at the top of the mask, which is why the contours are less distinct around the nose portion in both FIGS. 4C and 4D.

It is possible to teach individuals to review and distinguish between a good seal and a poor seal by looking at images. However, human reviewers require their subjects to remain stationary during a review, and take deep breaths to enhance the distinction between an inhale and an exhale. It may even be possible for a human reviewer to guess at where a leak is.

However, it is expressly desired to have systems and methods that can automatically detect, image and review whether an RPD seal is adequate or not. In many countries, the regulatory standard is that no leakage should be present. Having each worker in a work zone wearing an RPD with a leak-free seal is therefore an important safety concern. It is desired to have camera systems that can image an individual while that individual is working, walking or completing a task.

As described herein, IR cameras capture images of individuals wearing RPDs. Based on those images, the RPD is isolated and a temperature profile is generated, providing an understanding of the differences between the individual's inhale and exhale. The temperature profile can be compared to a database of temperature profiles in order to detect where a leak is present. Based on a detected leak, instructions are retrieved to provide to the individual to reduce leakage.

In some embodiments, the RPD is segmented within the IR images and, based on the segmentation, a 3D mesh of the RPD can be mapped to the individual's face. The 3D structure allows for systems and methods herein to determine whether the RPD seals or fits well to the individual's face. A surface topography and a height from the mask surface to the face of the individual can be obtained based on the inhale and exhale image sequences. In some embodiments, a camera captures 3D image features. In other embodiments, the 3D mesh is generated based on 2D images.

The segmentation may also be useful for tracking the individual, in embodiments where images are captured while individual is in motion, e.g. walking toward a camera, turning their head, talking, etc. Segmented portions of a first images can be matched and compared across later images, allowing for clear comparisons over time to be taken.

Using a deep learning algorithm, systems and methods herein capture IR images with an IR camera and, based on a segmentation and/or a 3D mesh, analyze a fit of an RPD, both checking for leaks and determining whether a particular RPD model is a good fit for a user.

Figure 5:
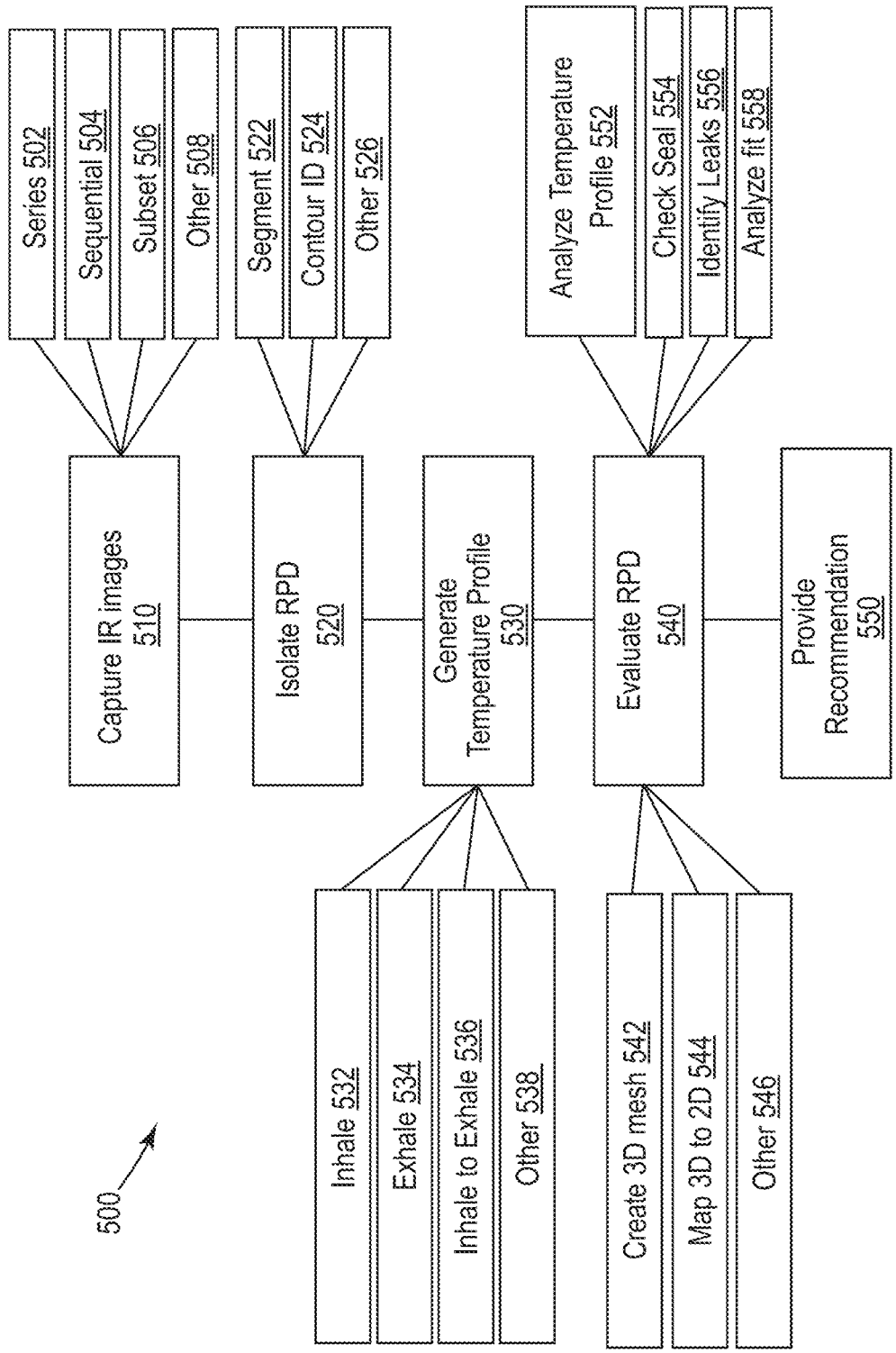
FIG. 5 illustrates a method of evaluating an RPD in accordance with embodiments herein.

FIG. 5 illustrates a method of evaluating an RPD in accordance with embodiments herein. Method 500 may be implemented in an environment where individuals require RPD protection. The environment may have one or more mounted, stationary, mobile or roving camera systems capable of taking IR photographs. Method 500 may proceed automatically, in some embodiments, when a person wearing an RPD is detected within a field of view of a camera, which may be done using any known or future developed techniques. Detecting a person may involve detecting movement within a field of vision of a camera and identifying it as a human. Detecting a person may also include identifying the person, for example as a nurse vs a doctor, or as a particular individual, such as Nurse John Doe. In some embodiments, different PPE requirements may be necessary based on the identity of the identified person. For example, a nurse may require a respirator while a surgical mask may be sufficient for a doctor.

In block 510, images of the individual are captured using an IR camera. A number of images may be captured, to ensure that sufficient data is available to analyze. The captured images may be a series of images captured by a camera, as indicated in block 502, or sequential frames of a video captured by a camera, as indicated in block 504. The camera may only pass on a subset of images captured, as indicated in block 506. For example, a video captured may have a high enough frame rate such that sequential frames are too close together to capture data from which a temperature profile can be generated of a user inhaling, exhaling, or both. In embodiments where analysis is done remote from the camera, sending only a subset of frames may allow for faster data transmission and analysis. Other image selections, as indicated in block 508, are also expressly contemplated.

In block 520, an RPD is identified and isolated in the captured images. The RPD may be segmented, and an edge of a seal identified, as indicated in block 522. One or more contours of the RPD may be identified, as indicated in block 524. Identifying a contour of an RPD may include identifying one or more seams or folds of an RPD, which may be used for identifying a manufacturer or model of the RPD. Identifying a contour may also include identifying an RPD edge where a seal should be present. Isolating an RPD may also include digitally adjusting the captured images in order to minimize interference caused by the individual moving when the images were captured, make the contours clearer, or temperature extremes more distinct. Other enhancements 526 may also be done to clarify the RPD in the captured IR images.

In block 530, a temperature profile is generated. The temperature profile is generated from the captured IR images and can be used to identify leaks or gaps in a seal. The temperature profile may be generated based on captured images of a user during a period of inhale, as indicated in block 532. The temperature profile may be generated based on captured images of a user during a period of exhale, as indicated in block 534. The temperature profile may based images capturing a period containing both an inhale and an exhale, as indicated in block 536. Other time periods are also envisioned, as indicated in block 538. Generating a temperature profile may include detecting a color change in each pixel of an RPD over the captured time period. The temperature can be estimated for each region. The color change is then detected for each region. A heat air flow is generated during the inhale and/or exhale. A trajectory is predicted of heat flow under different seal conditions and, based on a comparison of the heat air flow and the trajectory, a seal condition is determined.

In block 540, the RPD is evaluated. Evaluating the RPD may include creating a 3D mesh of the RPD, as indicated in block 542. The 3D mesh may be generated based on 2D images. In some embodiments, creating a 3D mesh may be done using a 3D camera or video camera. The 3D mesh may be mapped to the 2D images captured using the IR cameras, to another image, captured from another camera, or a 2D image retrieved from a database. The RPD may be evaluated using other methods, as indicated in block 546.

Evaluating the RPD may include analyzing a temperature profile, as indicated in block 552. The temperature profile may be overlayed over a 2D or 3D image of the individual, or may be analyzed separately. The temperature profile may be generated in a manner that allows it to be exported to a display component, in some embodiments. Once a temperature profile is generated, it is analyzed against a database of temperature profiles. The temperature profiles may include profiles from a variety of RPDs, from different manufacturers and of different models, as well as RPDs worn by a variety of individuals. For example, one RPD model may have a different temperature profile when worn by a heavy-set male than a petite female. Based on captured images, a type of RPD may be identified. Information for the wearer may be deidentified, in some embodiments, such that only a description of the individual without identifying marks or information is compared to a database. Alternatively, in some embodiments, evaluating the RPD includes retrieving fit data for the wearer, for example taken during an annual fit test for the individual.

Using the temperature profile, a seal of the RPD may be checked, as indicated in block 554. The seal may be checked for fit, for leaks, or other defects. Leaks may be identified, as indicated in block 556. Based on an evaluation of the seal and detection of any leaks, a fit of the RPD may be evaluated, as indicated in block 558. Analyzing the fit may include retrieving information relevant to improving fit. For example, information about how to seal leaks, based on a detected leak location (e.g. around a nose clip) may be retrieved.

In block 550, a recommendation is provided to improve the seal of the RPD. The recommendation may be output to a source, such as a display, a communications unit (such as a speaker), or a remote source. In some embodiments, the recommendation indicates where a leak is located. In some embodiments, the recommendation may also include a recommended adjustment, such as repositioning a nose clip. The recommendation may also include other information, such as indicating a consistent lack of fit, determined by a system that has access to historically calculated fit data, or recommend retraining on self-seal checking or a new RPD model or size.

FIGS. 6A-6B illustrate segmented images of an individual wearing an RPD. FIG. 6A illustrates a segmentation 610, and FIG. 6B has segmentation 660, which may be used to align and project the profile from the 2D images illustrated in FIGS. 6A-6B to a 3D mesh, such as that illustrated in FIGS. 7A-7B. The segmentation may allow for easier projection of the 2D profile onto a 3D mesh.

FIGS. 6A-6B illustrate clear grayscale images obtained from IR images of an individual wearing an RPD. FIG. 6A illustrates clear contours within RPD 620, indicative of a good seal, while FIG. 6B illustrates darker, unclear contours within RPD 670, indicative of a poor seal.

Segmentation is helpful for mapping the 2D IR images to a 3D mesh, which may be larger or smaller in some areas, based on pixel similarities. While either a 2D or 3D representation may be used for seal evaluation, the 3D mesh is helpful for further analysis of RPD fitness for an individual, providing information about where the RPD is tightly fit or loose.

Figure 7B:
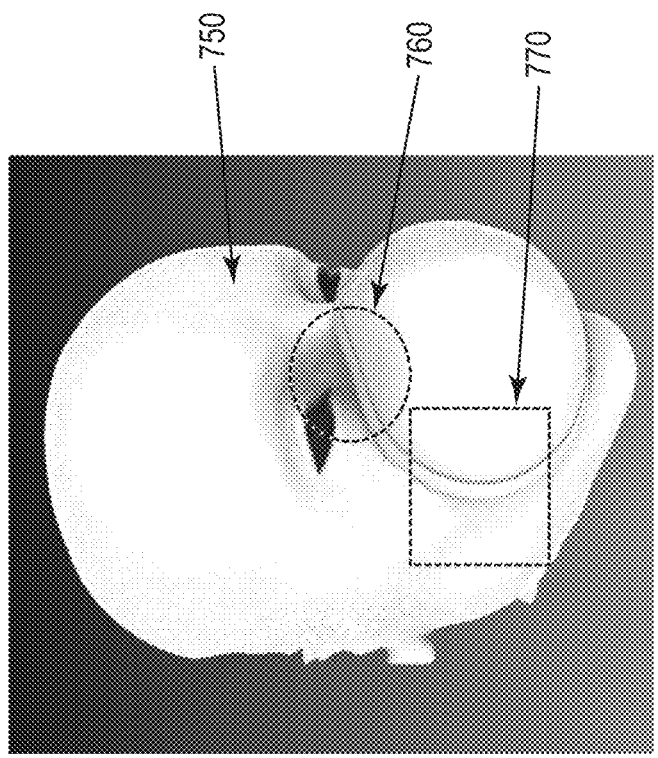
FIGS. 7A-7B illustrate 3D views of an individual wearing an RPD.
Figure 7A:
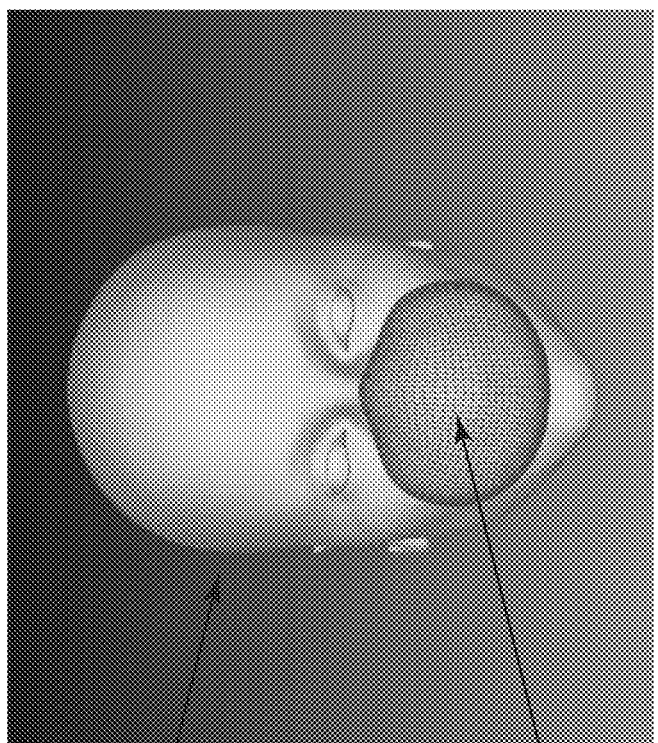

FIGS. 7A-7B illustrate 3D views of an individual wearing an RPD. As illustrated in FIG. 7A, a 3D scanned mesh of a human face wearing an N95 mask 720 is overlayed over a representation of a human face 710. In some embodiments, human face 710 is a representation of a detected wearer of the N95 mask, either generated based on captured 2D or 3D images taken concurrently as the IR images, or taken at a separate time. FIG. 7B illustrates a side view of a 3D projection. The mesh is removed for ease of illustration. An individual 750 is wearing an RPD with some leakage indicated by circle 760, and an area of good seal 770. The brighter area within rectangle 770, and darker area within circle 760, are generated from a temperature profile obtained using the IR images.

Figure 8:
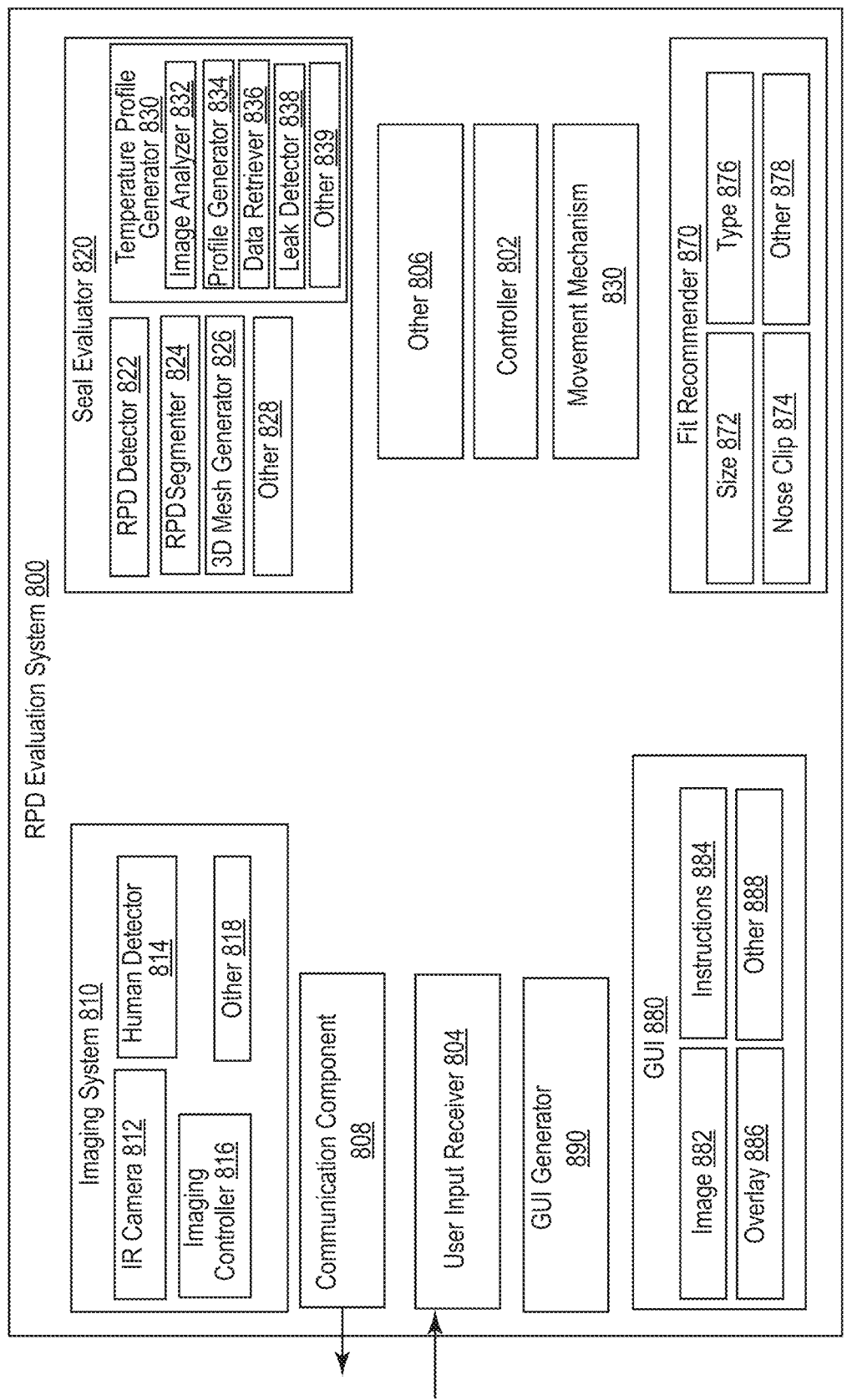
FIG. 8 illustrates a schematic of an RPD evaluation system in accordance with embodiments herein.

FIG. 8 illustrates a schematic of an RPD evaluation system in accordance with embodiments herein. System 800 may be built into an environment, for example with IR camera 812 mounted to a wall, corner or on a mobile unit within the environment. System 800 may also be part of a distributed system, for example with some portions located physically within an environment, and other portions accessible over a wireless or cloud-based network.

RPD evaluation system 800 includes an imaging system 810. Imaging system includes a camera system with an IR camera 812. In some embodiments, camera 812 is a camera system, with a light source, pan/tilt system, or movement mechanism. For example, camera 812 may be mounted on a wall, associated with an access point, or mounted on a mobile robot that roams an environment either on a preset or randomized pattern. While a single IR camera 812 is illustrated in FIG. 8, it is expressly contemplated that multiple IR cameras 812 may be present, or that another camera that captures images outside the IR spectrum is also included. Imaging system 810 may also include a human detector 814. In some embodiments, camera 812 may only capture or record images when a human is detected within a field of view. Such activity may be controlled by imaging controller 816, which may control movement of a robot system, or a pan/tilt system, or may activate or deactivate a light system, for example. Imaging system 810 may have other features 818 as well.

Seal evaluator 820 extracts features from images captured by imaging system 810 in order to output an evaluation of a seal of an RPD. Seal evaluator 820 may receive each image captured by imaging system 810, a video stream captured by imaging system 810, or a subset of data captured by imaging system 810. For example, IR camera 812 may capture images at a high enough rate, or a video camera may have a high frame rate, such that sequential images do not have sufficient contrast for feature detection/extraction. It may be more useful to compare images selected across a timeframe of an individual inhaling and exhaling. It may be desired to reduce a number of images processed by a seal evaluator 820 to a number sufficient for feature extraction while being conscious of data transfer and analysis speed.

Seal evaluator 820 may include an RPD detector 822, which may detect a type or size of RPD worn by an individual. An RPD segmenter 824 may segment the detected RPD, for example identifying an outer edge of the RPD, or subdividing the identified RPD into segments that can be mapped more easily onto a 3D representation generated by 3D mesh generator 826. However, it is expressly contemplated that, in some embodiments, seal evaluator 820 works solely from 2D images captured by IR camera 812. Seal evaluator 820 may include other components 828.

Seal evaluator 820 includes a temperature profile generator 830 that, based on the images from IR camera 812, generates a temperature profile that can be used to identify leaks in an RPD seal. The temperature profile may be generated based on images concerning an inhale of an RPD wearer, an exhale of an RPD wearer, or the combination of inhale and exhale of an RPD wearer. An image analyzer 832 may analyze the color change in pixels in the 2D images to determine how much the color changes from picture to picture. Depending on where a particular pixel is located, it is expected to see colors either change or stay the same during inhalation and/or exhalation. For example, if a good seal is present, a contour should remain clear and pixels representative of the seal should maintain their color during inhalation and/or exhalation. In contrast, pixels in the body of the RPD, where air is forced through the filter during inhalation and exhalation, should see color change.

Based on the pixel analysis, a temperature profile is generated by profile generator 834. The temperature profile is compared against data retrieved by data retriever 836, which may be retrieved based on an identified make or model of the RPD analyzed. The data retrieved may be other temperature profiles of similar RPDs such that seal evaluator 820 may isolate a location of a leak, using a leak detector 838. Based on the profile generated by temperature profile generator 830, other information 839 may also be gleaned about an RPD and its seal. For example, seal defects may be identifiable, or a loaded filter may be detected.

Fit recommender 870 may prepare recommendations for improving the fit of an RPD for an individual. In some embodiments, fit recommender 870 is only activated if a leak or other poor fit is obtained. A size recommender 872, for example, may determine whether, based on tightness or looseness detected by 3D mesh generator 826, that an RPD size is inappropriate. A new mask type recommender 876 may determine, based on poor fit, that a different make or model of RPD, for example based on a facial profile of the user, may fit better than a current RPD. Additionally, instructions may be provided on adjusting a nose clip 874 to provide a better fit. Other recommendations 878 may also be provided.

Figure 9:
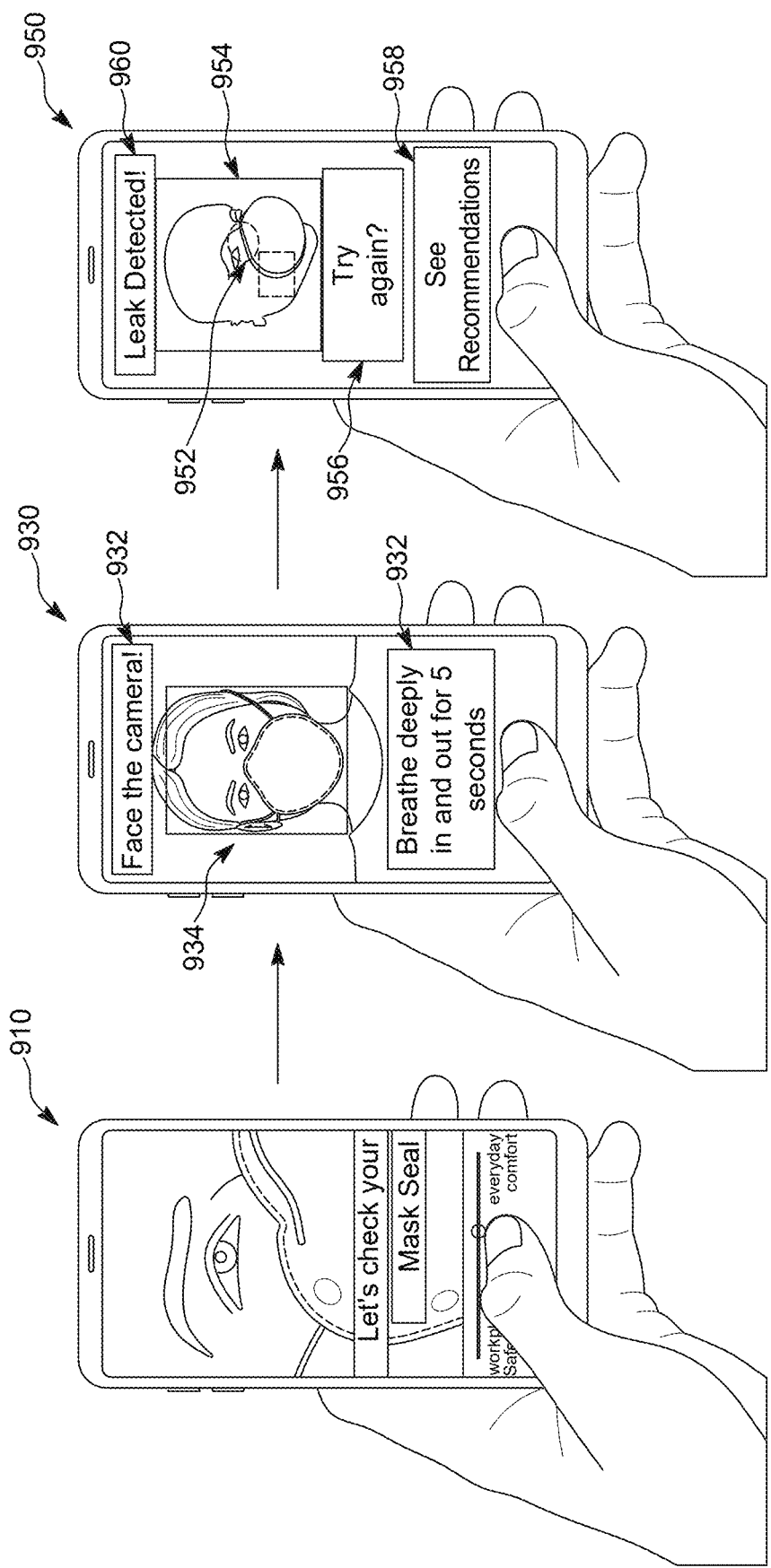
FIG. 9 illustrates a mobile application for form fitting a respiratory protection device to a wearer in accordance with embodiments herein.

In some embodiments, for example as described in greater detail in FIG. 9, fit check system 800 is built into a device with a display component, and a graphical user interface generator 890 that, based on information from seal evaluator 820 and fit recommender 870, generates a graphical user interface 880. GUI 880 may include an image 882, for example an IR image taken of an individual by IR camera 812. GUI 880 may include a quantitative overlay 886, which indicates where a seal is good or poor, such as that illustrated in FIG. 7B. Instructions 884 may be presented for improving a fit score. GUI 880 may also include other information 888 or images, such as a projection of images as captured by IR camera 812.

User input receiver 804 may receive input from a user. In embodiments where RPD evaluation system 800 is built into a device, such as a mobile computer, kiosk, mobile phone, tablet, etc., user input receiver 804 may include a keyboard. In some embodiments, user input receiver 804 includes a microphone that can pick up audio commands from a user.

Communication component 808 may communicate with a source remote from RPD evaluation system 800, for example over a wired, wireless, or cloud-based network. For example, historical data for a given user, or temperature profile information for different RPD manufactures, RPD models and different facial profiles may be stored remote from RPD evaluation system 800. Similarly, information relevant to identifying a particular human, using human detector 814, such as facial recognition information, may also be stored remote from RPD evaluation system 800.

Controller 802 may control activity of components of RPD evaluation system 800, for example activating seal evaluator 820, fit recommender 870 or communication component 808. Controller 802 may also cause GUI generator 890 to update a GUI 880 based on updated images from camera 812, or based on recommendations from fit recommender 870. Controller 802 may also control a movement mechanism 830, which may move a portion of imaging system 810, or may move a display component displaying GUI 880.

Fit check system may include other components 806 not described in detail with respect to FIG. 8.

In some embodiments, a seal check may be improved by knowing information about a user associated with the RPD. For example, having access to a regular breathing pattern for an individual may allow for system 800 to determine that a user is currently breathing shallowly or heavily, which may provide more in depth fit information. It may also be possible to connect system 800 to other PPE, such as a microphone associated with a hearing protection device or another device that may capture breathing information for an individual. Alternatively, using a radio-frequency antenna, a breathing pattern may be detected at a distance.

Additionally, using historical information about a user, fit information can be improved. For example, an image taken of a user at a previous date, with a known-good seal, may provide information about how to improve a seal. For example, it may be detected that a nose clip position is in a lower position than the known-good seal, suggesting that the nose clip needs to be repositioned. Similarly, using historical temperature profile data captured during a fit test, it may be possible to determine what has changed to cause a leaky seal detected currently.

FIG. 9 illustrates a mobile application for form fitting a respiratory protection device to a wearer in accordance with embodiments herein. FIG. 9 illustrates a progression of example graphical user interfaces 910, 930, 950 that a user may encounter while conducting a seal check for their RPD. An application such as that illustrated in FIG. 9 may be intended for general public use, for example for individuals wanting to wear an RPD to limit spread of an illness or to prevent themselves from getting sick. However, the graphical user interfaces represented in FIG. 9 may also be presented on a display associated with a kiosk or otherwise associated with a work environment, such as environment 1000, discussed below with respect to FIG. 10A.

Graphical user interface 910 illustrates an opening screen of an application that a user has opened.

Graphical user interface 930 illustrates a user receiving instructions for capturing IR image data of the user wearing an RPD. Instructions 932 are presented as both above and below an image 934. Image 934 may be a stock photo showing how the user should view the screen (e.g. facing forward), or may be a live view of what an IR camera attachment to a mobile computing device (or built into the mobile computing device) is currently recording.

Graphical user interface 950 illustrates results presented to the user after a seal check has been conducted. A leak detection indication 960 may be presented. A 3D representation 954 may be presented, as indicated in FIG. 9. However, in some embodiments, only a 2D image is presented. An overlay indication 952 of where a leak is detected may be presented. An option to retry the seal check 956 may be presented. For example, a user may want to retake the test after seeing and implementing recommendations 958.

The seal evaluation and recommendations may be generated locally, using a CPU of the mobile computing device, in one embodiment. In another embodiment, the images captured of the user are wirelessly transferred to a remote server that generates a temperature profile and detects leaks by comparing the generated temperature profile to a database of profiles indicative of different leak locations.

Figure 10A:
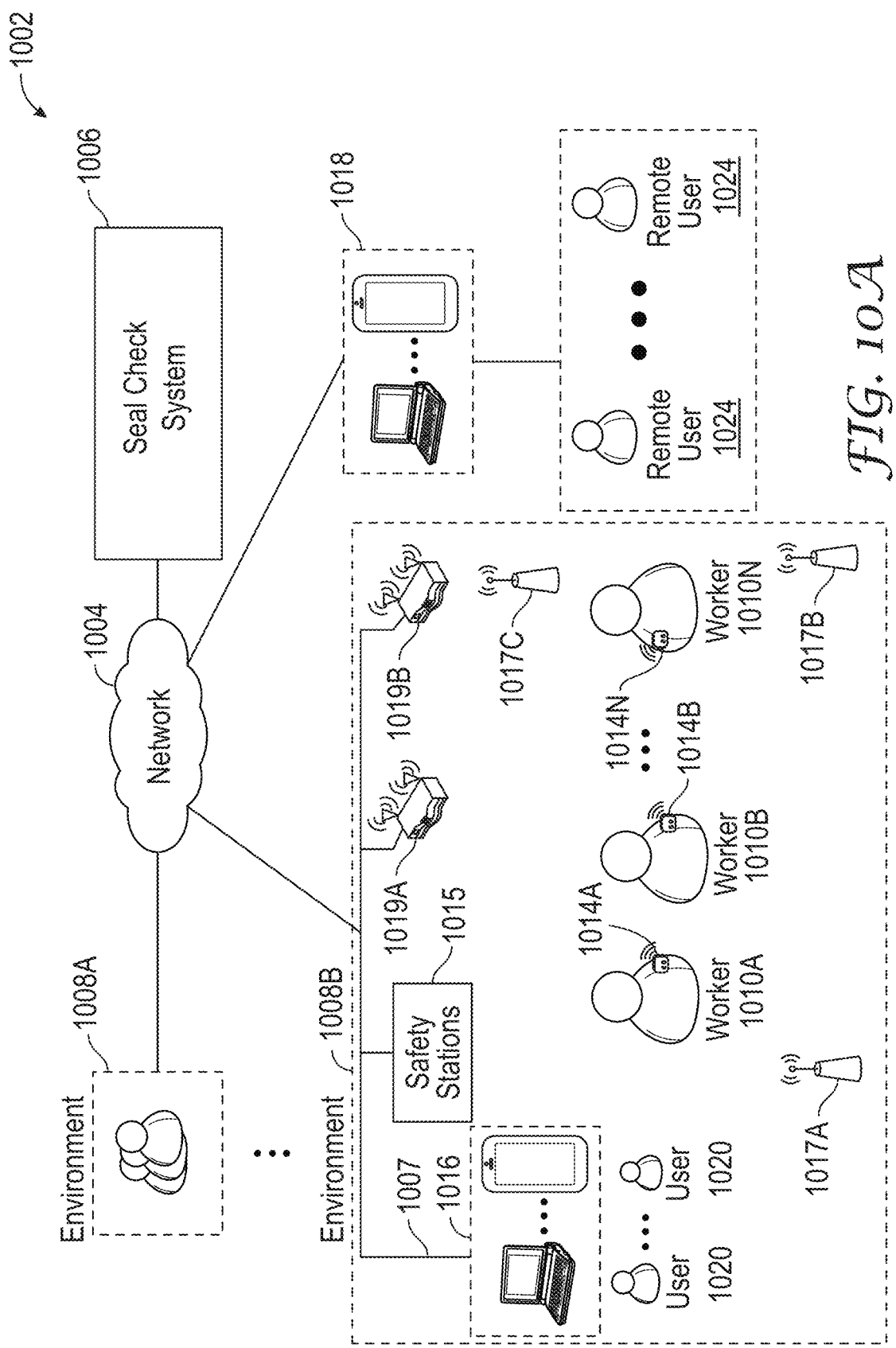
FIGS. 10A-10B illustrate an environment in which embodiments herein may be useful.
Figure 10B:
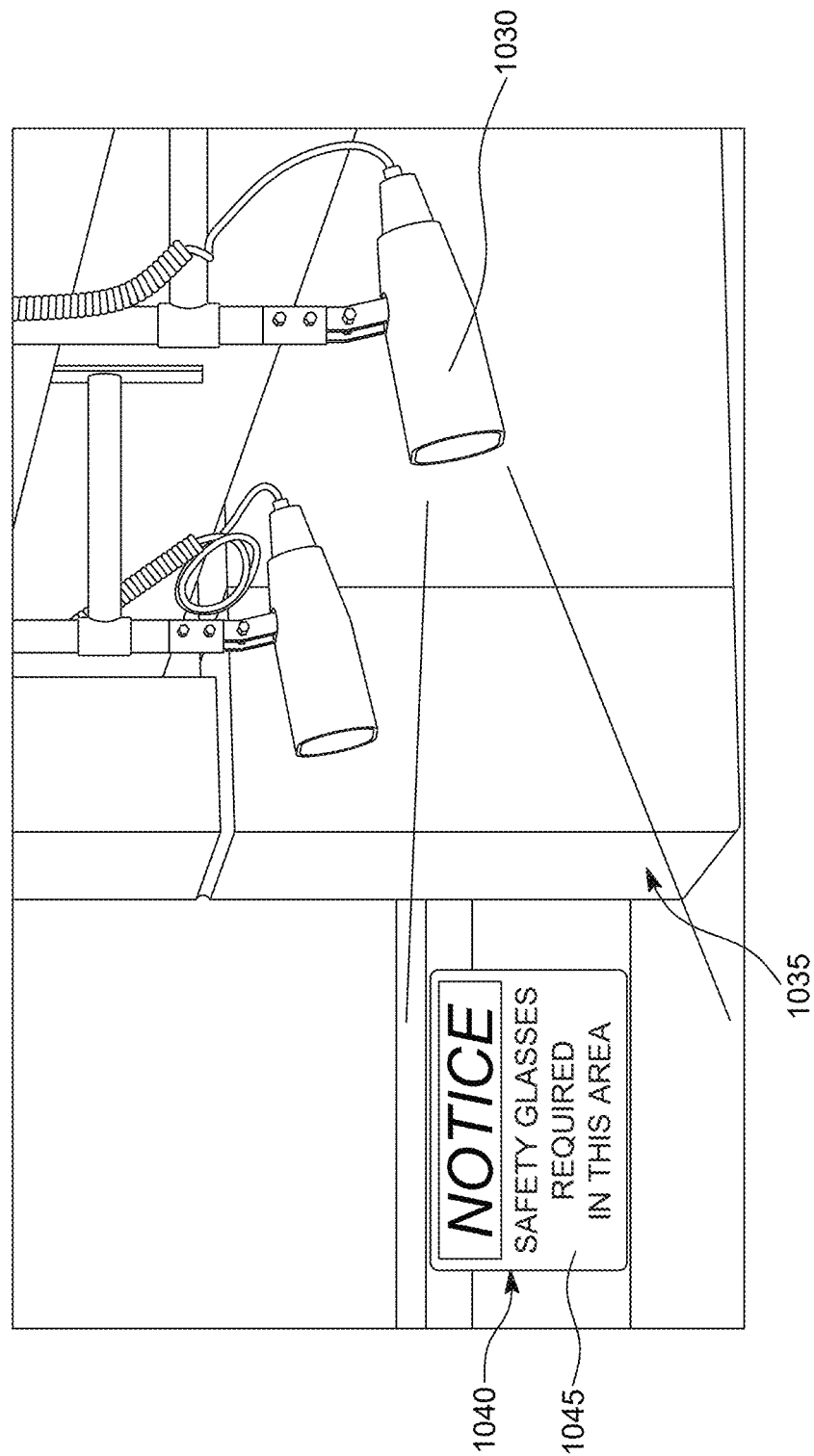

FIGS. 10A-10B illustrate an environment in which embodiments herein may be useful.

An environment 1000 may represent any number of environments in which workers may need to wear RPDs, such as healthcare settings, industrial settings, or any office setting during a pandemic or flu season. Environment 1000 includes a seal check system 1006 for detecting RPD-wearing individuals and checking the fit of their RPD.

Seal check system 1006 may reduce incidents of intentional or unintentional RPD misuse by workers in worksite 1002. Seal check system 1006 may also allow safety professionals to more easily manage health and safety compliance training, and determine which individuals need to change RPD size or models, or who needs retraining on donning RPDs correctly.

In general, seal check system 1006, as described in greater detail herein, is configured to identify RPD-wearing individuals within a worksite, conduct seal checks of those individuals and provide seal check results and recommendations to improve fit, when needed. System 1006 may be connected, through network 1004, to one or more devices or displays 1016 within an environment, or devices or displays 1018, remote from an environment. System 1006 may provide alerts to workers 1010A-1010N when a seal check comes back as failing, as well as provide feedback on how to improve fit.

System 1006 may also be integrated into entry protocols for secured areas within an environment such that workers that do not pass a seal check are restricted out of a secure or dangerous area.

As shown in the example of FIG. 10A, system 1002 represents a computing environment in which a computing device within of a plurality of physical environments 1008A, 1008B (collectively, environments 1008) electronically communicate with seal check system 1006 via one or more computer networks 1004. Each of physical environments 1008A and 1008B represents a physical environment, such as a work environment, in which one or more individuals, such as workers 1010, utilize respiratory protective devices while engaging in tasks or activities within the respective environment.

In this example, environment 1008A is shown as generally as having workers 1010, while environment 1008B is shown in expanded form to provide a more detailed example. In the example of FIG. 10A, a plurality of workers 1010A-1010N may be wearing a variety of different PPE, including an RPD.

In some examples, each of environments 1008 include computing facilities, such as displays 1016, by which workers 1010 can communicate with seal check system 1006. For examples, environments 1008 may be configured with wireless technology, such as 802.11 wireless networks, 802.15 ZigBee networks, and the like. In the example of FIG. 10A, environment 1008B includes a local network 1007 that provides a packet-based transport medium for communicating with seal check system 1006 via network 1004. In addition, environment 1008B may include a plurality of wireless access points 1019A, 1019B that may be geographically distributed throughout the environment to provide support for wireless communications throughout the work environment.

As shown in the example of FIG. 10A, an environment, such as environment 1008B, may also include one or more wireless-enabled beacons, such as beacons 1017A-1017C, that provide accurate location information within the work environment. For example, beacons 1017A-1017C may be GPS-enabled such that a controller within the respective beacon may be able to precisely determine the position of the respective beacon. Alternatively, beacons 1017A-1017C may include a pre-programmed identifier that is associated in seal check system 1006 with a particular location. Based on wireless communications with one or more of beacons 1017, or data hub 1014 worn by a worker 1010, seal check system 1006 is configured to determine the location of the worker within work environment 1008B. In this way, event data reported to seal check system 1006 may be stamped with positional information.

In example implementations, an environment, such as environment 1008B, may also include one or more safety stations 1015 distributed throughout the environment to provide fit testing by accessing fit testing system 1006. Safety stations 1015 may allow one of workers 1010 to conduct a seal check by positioning themselves in front of a camera and following instructions provided either audibly, visually or otherwise by safety station 1015.

In addition, each of environments 1008 include computing facilities that provide an operating environment for end-user computing devices 1016 for interacting with seal check system 1006 via network 1004. For example, each of environments 1008 typically includes one or more safety managers or supervisors, represented by users 1020 or remote users 1024, are responsible for overseeing safety compliance within the environment. In general, each user 1020 or 1024 interacts with computing devices 1016, 1018 to access seal check system 1006. For example, the end-user computing devices 1016, 1018 may be laptops, desktop computers, mobile devices such as tablets or so-called smart cellular phones.

Seal check system 1006 may be configured to actively monitor workers 1010A-1010N and other users 1020 within an environment 1008 both for correct usage of RPDs. Referring to FIG. 10B, a worksite may have one or more cameras 1030, either fixed within the worksite, mobile (e.g. drone, robot or equipment-mounted) or associated with a worker 1010A-1010N (e.g. an augmented reality headset or other camera worn in association with PPE, etc.). Using the one or more cameras, seal check system 1006 may be able to automatically identify whether or not a worker 1010A-1010N passes or fails a seal check, without the worker 1010A-1010N being interrupted during a task.

As another example, seal check system 1006 may further trigger an alert if a seal check is failed, either once or repeatedly by a given worker. The alert may be sent to worker 1010, either through a communication feature of a PPE, a separate communication device, or through a public address system within the environment. A failed seal check alert may also be sent to a supervisor or safety officer associated with the environment 1008 as well. Seal check results items may also be tracked and stored within a database, as described herein.

Figure 11:
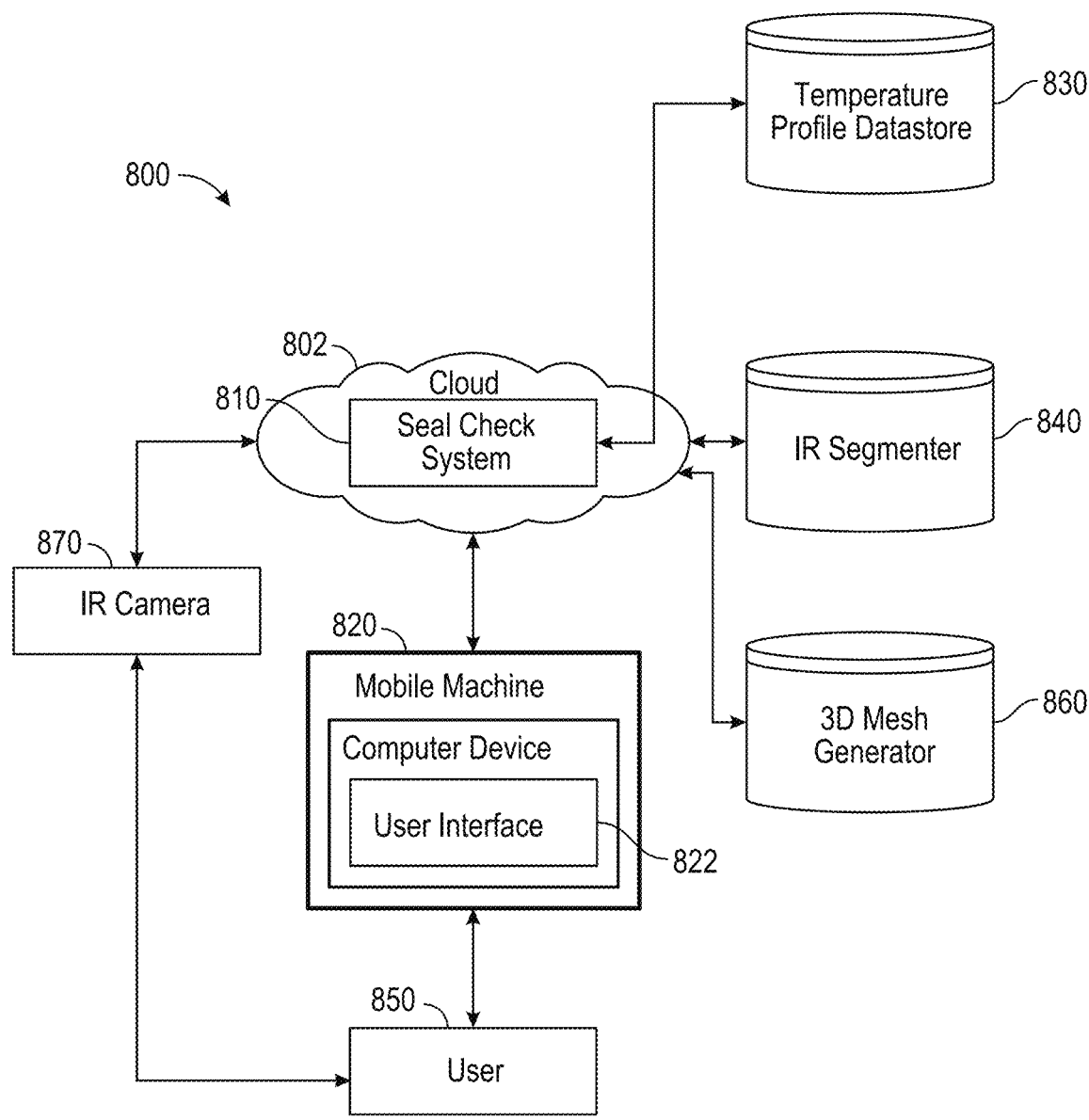
FIG. 11 illustrates a seal check system architecture.

FIG. 11 is a block diagram of a seal check system architecture. The remote server architecture 1100 illustrates one embodiment of an implementation of seal check system 1110. As an example, remote server architecture 1100 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown or described in FIGS. 1-10 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided by a conventional server, installed on client devices directly, or in other ways.

In the example shown in FIG. 11, some items are similar to those shown in earlier figures. FIG. 11 specifically shows that a seal check system 1110 can be located at a remote server location 1102. Therefore, computing device 1120 accesses those systems through remote server location 1102. User 1150 can use computing device 1120 to access user interfaces 1122 as well. For example, a user 1150 may be a user wanting to check a fit of their respiratory protection device while sitting in a parking lot, and interacting with an application on the user interface 1122 of their smartphone 1120, or laptop 1120, or other computing device 1120.

FIG. 11 shows that it is also contemplated that some elements of systems described herein are disposed at remote server location 1102 while others are not. By way of example, storage 1130, 1140 or 1160 or a camera 1170 can be disposed at a location separate from location 1102 and accessed through the remote server at location 1102. Additionally, while some data stores 1130, 1140, 1160 are illustrated, it is expressly contemplated that other information may be retrieved or generated by systems or methods herein. For example, IR raw image and metadata may be stored from previous image analysis in order to improve future fit detection. Additionally, seal estimation scores may also be stored. Regardless of where they are located, they can be accessed directly by computing device 1120, through a network (either a wide area network or a local area network), hosted at a remote site by a service, provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. This may allow a user 1150 to interact with system 1110 through their computing device 1120, to initiate a seal check process.

It will also be noted that the elements of systems described herein, or portions of them, can be disposed on a wide variety of different devices. Some of those devices include servers, desktop computers, laptop computers, imbedded computer, industrial controllers, tablet computers, or other mobile devices, such as palm top computers, cell phones, smart phones, multimedia players, personal digital assistants, etc.

Figure 12:
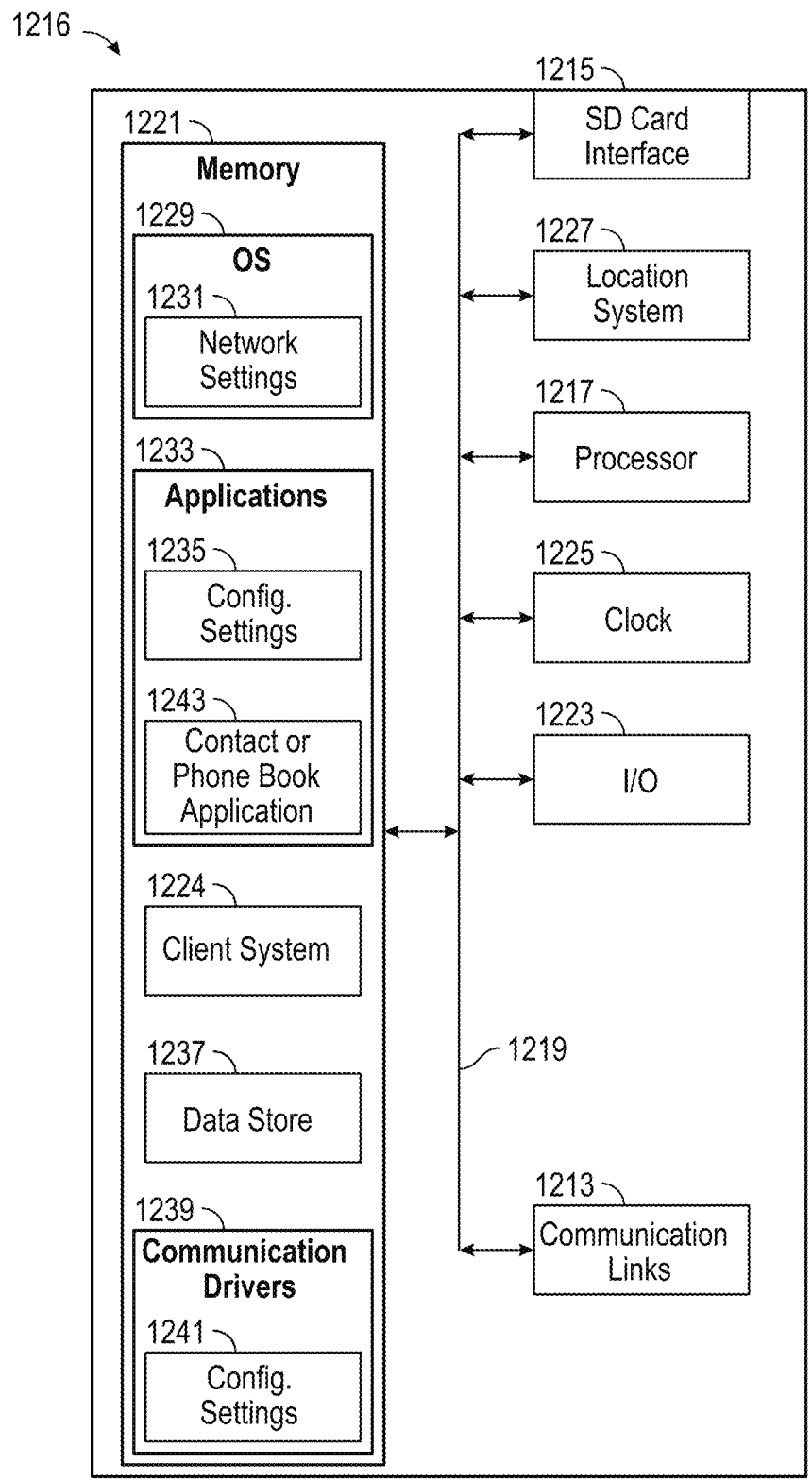
FIGS. 12-14 illustrate example devices that can be used in embodiments herein.
Figure 13:
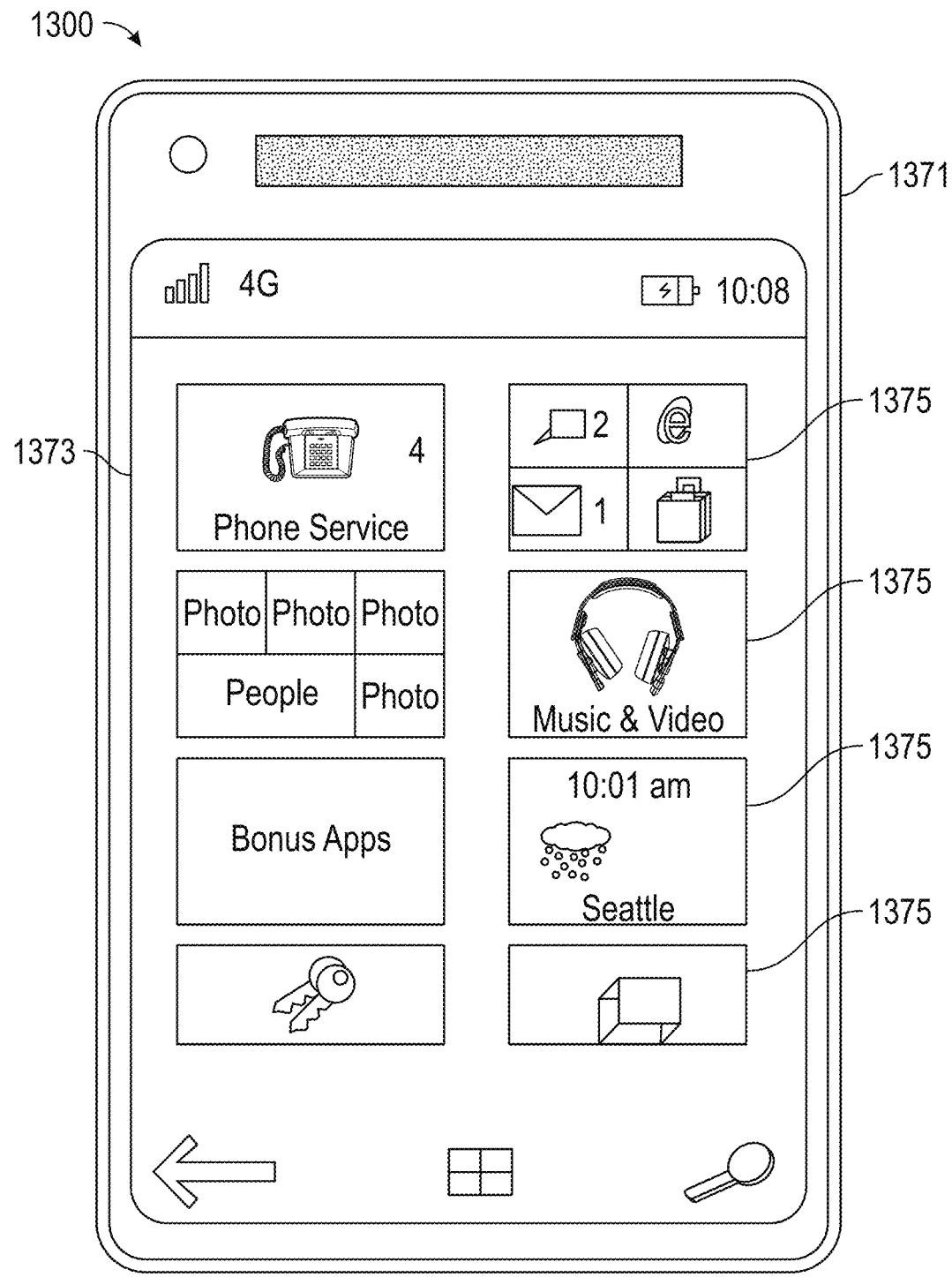
Figure 14:
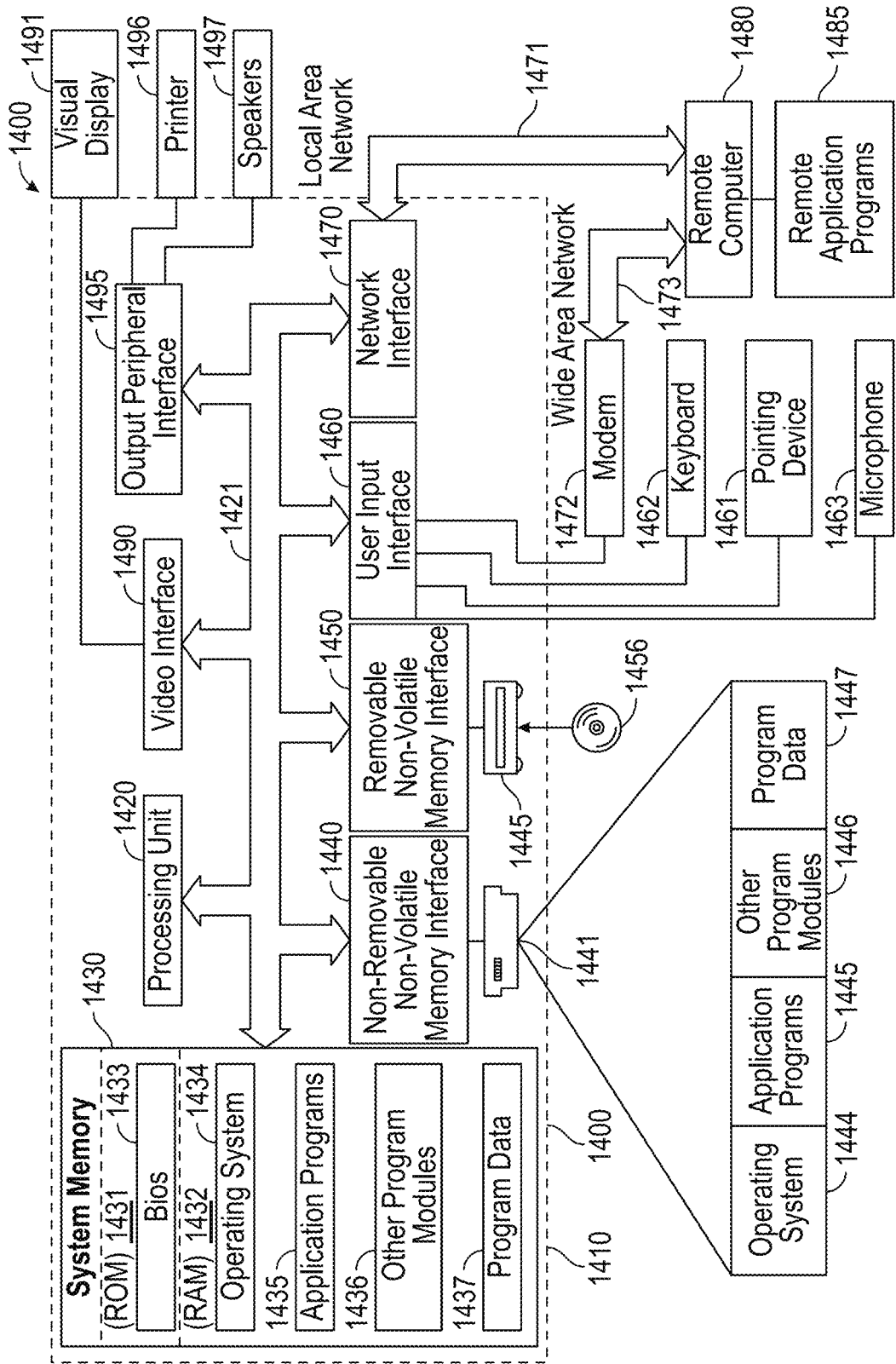

FIGS. 12-14 illustrate example devices that can be used in the embodiments shown in previous Figures. FIG. 12 illustrates an example mobile device that can be used in the embodiments shown in previous Figures. FIG. 12 is a simplified block diagram of one illustrative example of a handheld or mobile computing device that can be used as either a user's device or a supervisor/safety officer device, for example, in which the present system (or parts of it) can be deployed. For instance, a mobile device can be deployed in the operator compartment of computing device for use in generating, processing, or displaying the data.

FIG. 12 provides a general block diagram of the components of a mobile cellular device 1216 that can run some components shown and described herein. Mobile cellular device 1216 interacts with them or runs some and interacts with some. In the device 1216, a communications link 1213 is provided that allows the handheld device to communicate with other computing devices and under some embodiments provides a channel for receiving information automatically, such as by scanning. Examples of communications link 1213 include allowing communication though one or more communication protocols, such as wireless services used to provide cellular access to a network, as well as protocols that provide local wireless connections to networks.

In other examples, applications can be received on a removable Secure Digital (SD) card that is connected to an interface 1215. Interface 1215 and communication links 1213 communicate with a processor 1217 (which can also embody a processor) along a bus 1219 that is also connected to memory 1221 and input/output (I/O) components 1223, as well as clock 1225 and location system 1227.

I/O components 1223, in one embodiment, are provided to facilitate input and output operations and the device 1216 can include input components such as buttons, touch sensors, optical sensors, microphones, touch screens, proximity sensors, accelerometers, orientation sensors and output components such as a display device, a speaker, and or a printer port. Other I/O components 1223 can be used as well.

Clock 1225 illustratively comprises a real time clock component that outputs a time and date. It can also provide timing functions for processor 1217.

Illustratively, location system 1227 includes a component that outputs a current geographical location of device 1216. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 1221 stores operating system 1229, network settings 1231, applications 1233, application configuration settings 1235, data store 1237, communication drivers 1239, and communication configuration settings 1241. Memory 1221 can include all types of tangible volatile and non-volatile computer-readable memory devices. It can also include computer storage media (described below). Memory 1221 stores computer readable instructions that, when executed by processor 1217, cause the processor to perform computer-implemented steps or functions according to the instructions. Processor 1217 can be activated by other components to facilitate their functionality as well. It is expressly contemplated that, while a physical memory store 1221 is illustrated as part of a device, that cloud computing options, where some data and/or processing is done using a remote service, are available.

FIG. 13 shows that the device can also be a smart phone 1371. Smart phone 1371 has a touch sensitive display 1373 that displays icons or tiles or other user input mechanisms 1375. Mechanisms 1375 can be used by a user to run applications, make calls, perform data transfer operations, etc. In general, smart phone 1371 is built on a mobile operating system and offers more advanced computing capability and connectivity than a feature phone. Note that other forms of the devices are possible.

FIG. 14 is one example of a computing environment in which elements of systems and methods described herein, or parts of them (for example), can be deployed. With reference to FIG. 14, an example system for implementing some embodiments includes a general-purpose computing device in the form of a computer 1410. Components of computer 1410 may include, but are not limited to, a processing unit 1420 (which can comprise a processor), a system memory 1430, and a system bus 1421 that couples various system components including the system memory to the processing unit 1420. The system bus 1421 may be any of several types of bus structures including a memory bus or memory controller, a peripheral bus, and a local bus using any of a variety of bus architectures. Memory and programs described with respect to systems and methods described herein can be deployed in corresponding portions of FIG. 14.

Computer 1410 typically includes a variety of computer readable media. Computer readable media can be any available media that can be accessed by computer 1410 and includes both volatile/nonvolatile media and removable/non-removable media. By way of example, and not limitation, computer readable media may comprise computer storage media and communication media. Computer storage media is different from, and does not include, a modulated data signal or carrier wave. It includes hardware storage media including both volatile/nonvolatile and removable/non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1410. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1430 includes computer storage media in the form of volatile and/or nonvolatile memory such as read only memory (ROM) 1431 and random-access memory (RAM) 1432. A basic input/output system 1433 (BIOS) containing the basic routines that help to transfer information between elements within computer 1410, such as during start-up, is typically stored in ROM 1431. RAM 1432 typically contains data and/or program modules that are immediately accessible to and/or presently being operated on by processing unit 1420. By way of example, and not limitation, FIG. 14 illustrates operating system 1434, application programs 1435, other program modules 1436, and program data 1437.

The computer 1410 may also include other removable/non-removable and volatile/nonvolatile computer storage media. By way of example only, FIG. 14 illustrates a hard disk drive 1441 that reads from or writes to non-removable, nonvolatile magnetic media, nonvolatile magnetic disk 1452, an optical disk drive 1455, and nonvolatile optical disk 1456. The hard disk drive 1441 is typically connected to the system bus 1421 through a non-removable memory interface such as interface 1440, and optical disk drive 1455 are typically connected to the system bus 1421 by a removable memory interface, such as interface 1450.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 1410. In FIG. 14, for example, hard disk drive 1441 is illustrated as storing operating system 1444, application programs 1445, other program modules 1446, and program data 1447. Note that these components can either be the same as or different from operating system 1434, application programs 1435, other program modules 1436, and program data 1437.

A user may enter commands and information into the computer 1410 through input devices such as a keyboard 1462, a microphone 1463, and a pointing device 1461, such as a mouse, trackball or touch pad. Other input devices (not shown) may include a joystick, game pad, satellite receiver, scanner, a gesture recognition device, or the like. These and other input devices are often connected to the processing unit 1420 through a user input interface 1460 that is coupled to the system bus but may be connected by other interface and bus structures. A visual display 1491 or other type of display device is also connected to the system bus 1421 via an interface, such as a video interface 1490. In addition to the monitor, computers may also include other peripheral output devices such as speakers 1497 and printer 1496, which may be connected through an output peripheral interface 1495.

The computer 1410 is operated in a networked environment using logical connections, such as a Local Area Network (LAN) or Wide Area Network (WAN) to one or more remote computers, such as a remote computer 1480. The computer may also connect to the network through another wired connection. A wireless network, such as WiFi may also be used.

When used in a LAN networking environment, the computer 1410 is connected to the LAN 1471 through a network interface or adapter 1470. When used in a WAN networking environment, the computer 1410 typically includes a modem 1472 or other means for establishing communications over the WAN 1473, such as the Internet. In a networked environment, program modules may be stored in a remote memory storage device. FIG. 14 illustrates, for example, that remote application programs 1485 can reside on remote computer 1480.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Here, the exemplary embodiments of the present invention have been described in detail, but it should be understood that the present invention is not limited to the specific embodiments described and illustrated in detail above. Those skilled in the art can make various variations and variants of the present invention without departing from the gist and scope of the present invention. All these variations and variants fall within the scope of the present invention. Moreover, all components described here can be replaced by other technically equivalent components.

A fit detection system for a respiratory protection device is presented that includes an infrared camera that captures an image sequence of a user wearing the respiratory protection device. The system also includes a temperature change detector that analyzes images in the image sequence and detects a temperature change profile of the respiratory protection device. The system also includes a communication component that communicates a fit indication based on the detected temperature change profile.

The system may be implemented such that it also includes a segmenter that analyzes the image sequence and segments each image in the image sequence.

The system may be implemented such that the temperature change detector detects a temperature change between an inhale and an exhale of the user.

The system may be implemented such that the temperature change detector includes an auxiliary sensor.

The system may be implemented such that it includes an image identifier that identifies an inhale image, indicative of the inhale, and an exhale image, indicative of the exhale.

The system may be implemented such that the communication component communicates the fit indication to a display.

The system may be implemented such that the communication component communicates the infrared images to the display.

The system may be implemented such that, based on the segmented images, a 3D mesh generator generates a 3D mesh of the respiratory protection device.

The system may be implemented such that, based on the 3D mesh generator, a seal between the respiratory protection device and a face of the user is evaluated.

The system may be implemented such that a leak is detected in the seal.

The system may be implemented such that the fit indication includes an indication of a location of the leak.

The system may be implemented such that, based on the temperature change profile, a fit evaluation is conducted.

The system may be implemented such that the fit evaluation includes a comparison of an inhale pixel color of an inhale pixel, in the inhale image, to an exhale pixel color of an exhale pixel, in the exhale image.

The system may be implemented such that a first location, of the inhale pixel, is within a detected edge of the respiratory protection device.

The system may be implemented such that the IR camera automatically captures the image sequence upon detecting the user in a field of view of the camera.

The system may be implemented such that the camera is part of a stationary system.

The system may be implemented such that the camera is part of a mobile system.

The system may be implemented such that the system is a mobile computing system.

The system may be implemented such that the IR camera is built into the mobile computing system.

The system may be implemented such that the IR camera includes a portable IR lens that couples to the mobile computing system.

The system may be implemented such that the communication component includes a graphical user interface generator that generates a graphical user interface for a display of the mobile computing system.

The system may be implemented such that the mobile computing system is a mobile phone.

The system may be implemented such that the mobile computing system is a tablet.

The system may be implemented such that the feature extractor detects a movement of the respiratory protection device in the image sequence.

The system may be implemented such that the image capture is triggered by a touch-free command.

The system may be implemented such that the touch-free command is an audio command from the user.

The system may be implemented such that the communication component communicates an alert if the fit indication is unsatisfactory.

The system may be implemented such that the alert includes instructions for increasing a fit of the respiratory protection device.

The system may be implemented such that the communication component communicates the fit indication to a graphical user interface generator. The graphical user interface generator generates a graphical user interface that displays a fit indication.

The system may be implemented such that the fit indication includes a pass or fail indication, an indication of a leak source, or an instruction for improving the fit of the respiratory protection device.

The system may be implemented such that it also includes an auxiliary sensor configured to detect an inhalation depth.

The system may also include an auxiliary sensor configured to detect a length of an inhalation.

The system may also include an auxiliary sensor configured to detect a length of an exhalation.

A method for checking a fit of a respiratory protection device is presented that includes capturing a sequence of infrared images of a wearer of the respiratory protection device. The method also includes isolating the respiratory protection device portion of the captured images. The method also includes detecting a temperature change profile of the respiratory protection device over time, from the captured images. The method also includes, based on the temperature change profile, determining a seal quality of the respiratory protection device.

The method may also include communicating the seal quality, using a communication component.

The method may be implemented such that isolating the respiratory protection device includes: segmenting a portion of the captured images containing the respiratory protection device.

The method may also include generating a 3D mesh of the respiratory protection device.

The method may be implemented such that it includes identifying a leak in a seal of the respiratory protection device based on the segmentation.

The method may also include identifying a leak in a seal of the respiratory protection device based on the 3D mesh.

The method may also include overlaying the 3D mesh with the segmented images of the respiratory protection device.

The method may be implemented such that detecting a temperature change profile further includes: identifying an inhale image in the sequence of infrared images, identifying an exhale image in the sequence of infrared images, and comparing a temperature difference in a pixel between the inhale image and the exhale image.

The method may be implemented such that the steps of identifying the inhale image and identifying the exhale image are done automatically by a classification module.

The method may be implemented such that the classification module is a convolutional neural network.

The method may be implemented such that the seal quality includes a leak indication.

The method may be implemented such that the leak indication includes a leak location.

The method may be implemented such that the leak location is communicated to a graphical user interface generator which provides an indication of the leak location on a graphical user interface.

The method may be implemented such that the leak location is overlayed over one of the sequence of infrared images.

The method may be implemented such that the leak location is overlayed over a 3D mesh.

The method may also include generating, using an instructions generator, instructions for improving the seal quality.

The method may also include detecting the wearer in a field of view of the IR camera and, based on the detection, automatically completing the steps of capturing, isolating, detecting and determining.

The method may also include the wearer activating an application on a computing device and, based on the activation, automatically completing the steps of capturing, isolating, detecting and determining.

The method may be implemented such that the computing device includes the camera.

The method may be implemented such that the camera is separate from the computing device.

The method may be implemented such that communicating includes providing an alert that the seal quality is below a threshold.

The method may be implemented such that detecting a temperature change profile includes analyzing pixel intensity.

The method may be implemented such that determining the seal quality includes receiving an ambient temperature indication. Determining the seal quality includes analyzing a database of temperature change profile data matching the ambient temperature indication.

The method may be implemented such that determining the seal quality includes: identifying a manufacturer and model of the RPD. Determining the seal quality includes analyzing a database of temperature change profile data matching the identified RPD manufacturer and model.

A touch free safety monitoring system is presented that includes an IR camera with a field of view configured to, when an individual is detected within the field of view, capture a sequence of IR images of a face of the individual. The system also includes a temperature profile generator that, based on the images, generates a temperature profile of a respiratory protection device on the face of the individual. The system also includes a seal evaluator that, based on the temperature profile, evaluates a quality of a seal between the respiratory protection device and the face of the individual. The system also includes a communication module that communicates the seal quality.

The system may be implemented such that the system is mounted to a mobile station configured to move about an environment.

The system may be implemented such that the mobile station automatically moves about the environment according to a movement pattern.

The system may be implemented such that the system is incorporated into a device including the IR camera.

The system may be implemented such that the IR camera is a stationary camera within an environment.

The system may be implemented such that the communication module communicates the seal quality to an access point. Access is granted if the seal quality is acceptable.

The system may be implemented such that the communication module provides the seal quality to a fit log for the individual.

The system may be implemented such that, if the seal evaluator detects a leak based on the temperature profile, the communication module communicates a leak indication.

The system may be implemented such that the leak indication is provided visually, through a display.

The system may be implemented such that the leak indication is provided as an overlay over one of the captured IR images.

The system may be implemented such that the leak indication is provided as an overlay over a 3D mesh generated from the captured IR images.

The system may also include a segmenter that isolates the respiratory protection device in the captured images and segments the respiratory protection device in the captured images.

The system may also include a 3D mesh generator that generates a 3D mesh of the respiratory protection device based on the captured images.

EXAMPLES

Example 1: Fit Evaluation

A user wants to try on a new RPD. A Seal Evaluation System instructs the user to put on the RPD. The Seal Evaluation System instructs a camera to capture a sequence of infrared images of the user wearing the RPD. The Seal Evaluation System analyzes the sequence of images and detects a leak. The Seal Evaluation System provides an image overlay illustrating the leak location on the RPD to a nearby display so the user can see where the leak is. The Seal Evaluation System allows the user to adjust the RPD and repeat the evaluation process until no seal leak is detected.

Example 2: Fit Monitoring

A user is required to wear an RPD but is in motion during a shift in an environment. Regulations recommend a fit test every hour to ensure adequate sealing between the RPD and the user's face. A mobile Seal Evaluation System patrols the environment and detects the user. The mobile Seal Evaluation System then causes infrared images of the user's face to be captured, either by a mobile camera associated with the mobile Seal Evaluation System or by another camera that has the user in its field of view. A Seal Evaluation is then conducted and, if detected, a leak indication is provided to the user, either through an alert system, a display system, or another system.

What is claimed is:

1. A fit detection system for a respiratory protection device, the system comprising:
    an infrared camera that captures an image sequence of a user wearing the respiratory protection device;
    a temperature change detector that analyzes images in the image sequence and detects a temperature change profile of the respiratory protection device; and
    a communication component that communicates a fit indication based on the detected temperature change profile.

2. The system of claim 1, and further comprising:
    a segmenter that analyzes the image sequence and generates segments for each image in the image sequence.

3. The system of claim 2, wherein, based on the segmented images, a 3D mesh generator generates a 3D mesh of the respiratory protection device.

4. The system of claim 3, wherein, based on the 3D mesh generator, a seal between the respiratory protection device and a face of the user is evaluated.

5. The system of claim 1, and further comprising an image identifier that identifies an inhale image, indicative of an inhale, and an exhale image, indicative of an exhale.

6. The system of claim 1, wherein the IR camera automatically captures the image sequence upon detecting the user in a field of view of the camera.

7. The system of claim 1, wherein the feature extractor detects a movement of the respiratory protection device in the image sequence.

8. The system of claim 1, wherein the communication component communicates the fit indication to a graphical user interface generator, and wherein the graphical user interface generator generates a graphical user interface that displays a fit indication.

9. A method for checking a fit of a respiratory protection device, the method comprising:
    capturing a sequence of infrared images of a wearer of the respiratory protection device;
    isolating the respiratory protection device portion of the captured images;
    detecting a temperature change profile of the respiratory protection device over time, from the captured images; and
    based on the temperature change profile, determining a seal quality of the respiratory protection device.

10. The method of claim 9, and further comprising:
    communicating the seal quality, using a communication component.

11. The method of claim 9, wherein isolating the respiratory protection device comprises:
    segmenting a portion of the captured images containing the respiratory protection device; and
    identifying a leak in a seal of the respiratory protection device based on the segmentation.

12. The method of claim 11, and further comprising:
    generating a 3D mesh of the respiratory protection device; and
    identifying a leak in a seal of the respiratory protection device based on the 3D mesh.

13. The method of claim 11, and further comprising overlaying a generated 3D mesh of the respiratory device with the segmented images of the respiratory protection device.

14. The method of claim 9, wherein detecting a temperature change profile further comprises:
    identifying an inhale image in the sequence of infrared images;
    identifying an exhale image in the sequence of infrared images; and
    comparing a temperature difference in a pixel between the inhale image and the exhale image.

15. The method of claim 9, wherein the seal quality comprises a leak location and wherein the leak location is communicated to a graphical user interface generator which provides an indication of the leak location on a graphical user interface.

16. The method of claim 9, and further comprising the wearer activating an application on a computing device and, based on the activation, automatically completing the steps of capturing, isolating, detecting and determining.

17. The method of claim 9, wherein communicating comprises providing an alert that the seal quality is below a threshold.

18. The method of claim 9, wherein determining the seal quality comprises:
    receiving an ambient temperature indication and;

wherein determining the seal quality comprises analyzing a database of temperature change profile data matching the ambient temperature indication.

19. The method of claim 9, wherein determining the seal quality comprises:
identifying a manufacturer and model of the RPD and;
wherein determining the seal quality comprises analyzing a database of temperature change profile data matching the identified RPD manufacturer and model.

20. A touch free safety monitoring system comprising:
an IR camera with a field of view configured to, when an individual is detected within the field of view, capture a sequence of IR images of a face of the individual;
a temperature profile generator that, based on the images, generates a temperature profile of a respiratory protection device on the face of the individual;
a seal evaluator that, based on the temperature profile, evaluates a quality of a seal between the respiratory protection device and the face of the individual; and
a communication module that communicates the seal quality.

* * * * *